United States Patent
Hosoito et al.

(10) Patent No.: US 7,579,798 B2
(45) Date of Patent: Aug. 25, 2009

(54) INVERTER FOR WASHER AND INVERTER FOR WASHER-DRIER

(75) Inventors: Tsuyoshi Hosoito, Aichi (JP); Kazunobu Nagai, Aichi (JP)

(73) Assignees: Kabushiki Kaisha Toshiba, Tokyo (JP); Toshiba Ha Products Co., Ltd., Osaka (JP); Toshiba Consumer Marketing Corporation, Tokyo (JP)

( * ) Notice: Subject to any disclaimer, the term of this patent is extended or adjusted under 35 U.S.C. 154(b) by 794 days.

(21) Appl. No.: 10/498,249

(22) PCT Filed: Nov. 7, 2002

(86) PCT No.: PCT/JP02/11635

§ 371 (c)(1), (2), (4) Date: Mar. 14, 2005

(87) PCT Pub. No.: WO03/050341

PCT Pub. Date: Jun. 19, 2003

(65) Prior Publication Data

US 2005/0160771 A1  Jul. 28, 2005

(30) Foreign Application Priority Data

Dec. 13, 2001 (JP) ............................. 2001-380176

(51) Int. Cl.
*H02P 21/00* (2006.01)
(52) U.S. Cl. ....................... 318/400.02; 68/12.16; 8/159
(58) Field of Classification Search ................ 68/12.16, 68/12.02; 318/779, 59, 68, 85, 115, 120, 318/136, 280, 400.01, 400.02, 432, 599, 318/689, 700, 799; 8/159
See application file for complete search history.

(56) References Cited

U.S. PATENT DOCUMENTS

| | | | | | |
|---|---|---|---|---|---|
| 4,556,827 A | * | 12/1985 | Erdman | .................... | 318/400.3 |
| 4,843,671 A | * | 7/1989 | Hirooka et al. | ................ | 8/159 |
| 5,237,256 A | * | 8/1993 | Bashark | ...................... | 318/817 |
| 5,463,301 A | * | 10/1995 | Kim | ........................... | 318/801 |
| 5,778,703 A | * | 7/1998 | Imai et al. | .................. | 68/12.02 |
| 5,813,069 A | * | 9/1998 | Kim | ............................... | 8/159 |

(Continued)

FOREIGN PATENT DOCUMENTS

DE  198 06 258 A1  8/1998

(Continued)

OTHER PUBLICATIONS

Supplementary European Search Report dated Dec. 6, 2007 for corresponding European Application No. 02 78 0049.

*Primary Examiner*—Bentsu Ro
*Assistant Examiner*—Antony M Paul
(74) *Attorney, Agent, or Firm*—Pillsbury Winthrop Shaw Pittman, LLP

(57) ABSTRACT

An inverter for a washer performing drive control of an electric motor imparting a rotational driving force required for washing, rinsing and dehydrating operations in a full automatic washer performing the washing, rinsing and dehydrating processes continuously. The inverter comprises control means for operating the motor with a full field in the low speed rotational region of washing, rinsing and dehydrating operations, with weak field in the high speed rotational region of dehydrating operation, and performing vector control of the output of the motor in the case of full field operation, and voltage/phase control of the motor in the case of field weakening operation.

2 Claims, 16 Drawing Sheets

U.S. PATENT DOCUMENTS

| | | | | |
|---|---|---|---|---|
| 5,824,114 | A | * | 10/1998 | Pyo ................................ 8/159 |
| 5,913,952 | A | * | 6/1999 | Kim ................................ 8/159 |
| 5,979,194 | A | * | 11/1999 | Matsumoto et al. ......... 68/12.04 |
| 6,029,300 | A | * | 2/2000 | Kawaguchi et al. ............. 8/159 |
| 6,163,912 | A | * | 12/2000 | Matsuura et al. ................ 8/159 |
| 6,341,507 | B1 | * | 1/2002 | Rode et al. .................. 68/12.16 |
| 6,495,980 | B2 | * | 12/2002 | Cho et al. ............... 318/400.02 |

FOREIGN PATENT DOCUMENTS

| | | | |
|---|---|---|---|
| DE | 199 62 691 A1 | 7/2001 | |
| EP | 0 831 580 A2 | 3/1998 | |
| JP | 60-139186 | 7/1985 | |
| JP | 64-009040 | 12/1989 | |
| JP | 04-126192 | 4/1992 | |
| JP | 7-87780 A | 3/1995 | |
| JP | 10-117489 | 5/1998 | |
| JP | 11-114275 | 4/1999 | |
| JP | 11114275 A | * 4/1999 | |
| JP | 2000-84287 | 3/2000 | |
| JP | 2000-342883 | 12/2000 | |
| JP | 2001-145797 A | 5/2001 | |
| JP | 2001145797 A | * 5/2001 | |
| JP | 2001-171185 | 6/2001 | |
| JP | 2001-310097 A | 11/2001 | |

* cited by examiner

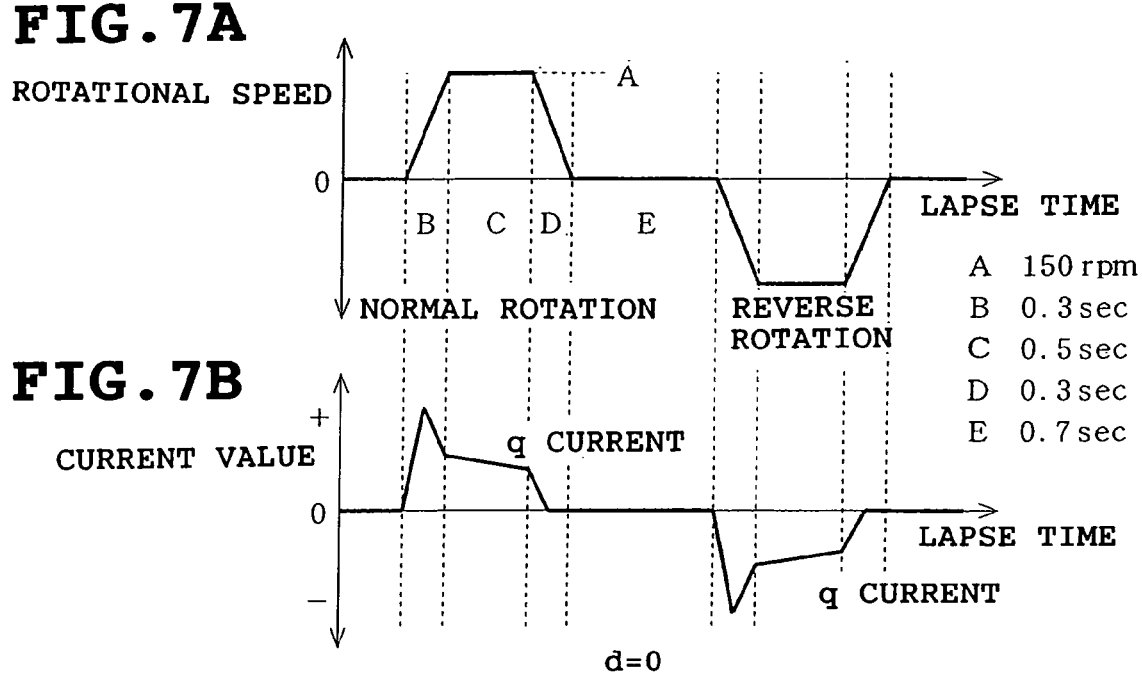
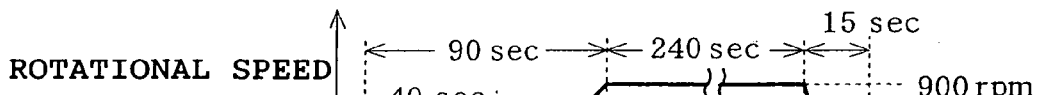
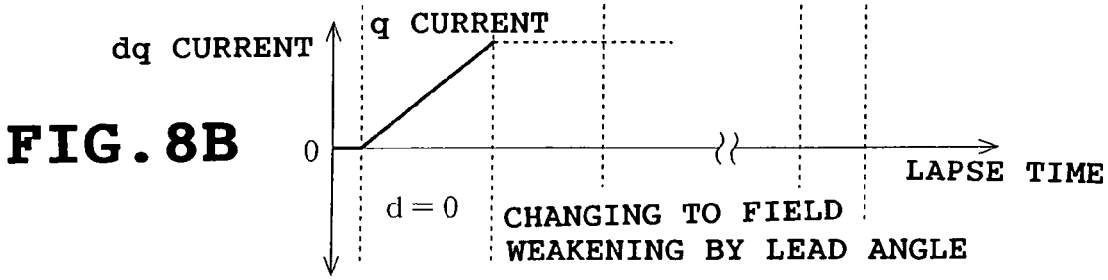

FIG. 9A
STATOR WINDING
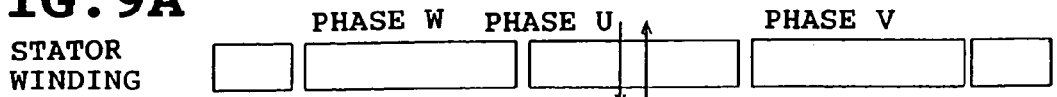
FIG. 9B
POSITION P0
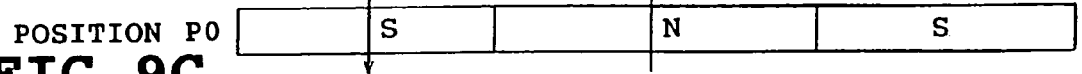
FIG. 9C
P1
FIG. 9D
P2
FIG. 9E
P3
FIG. 9F
P4
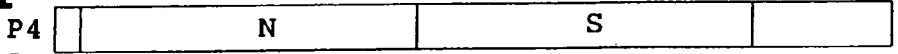
FIG. 9G
P5
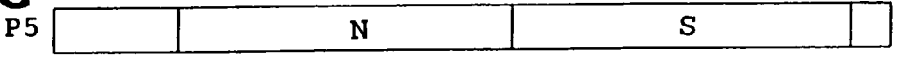
POSITIONAL RELATIONSHIP BETWEEN WINDING AND MAGNE
FIG. 9H
POSITIONAL RELATIONSHIP
FIG. 9I
CURRENT PHASE
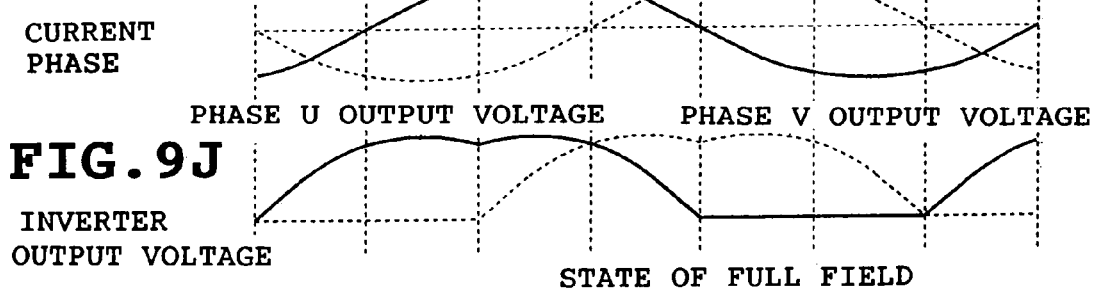
FIG. 9J
INVERTER OUTPUT VOLTAGE
STATE OF FULL FIELD
FIG. 9K
POSITIONAL RELATIONSHIP
FIG. 9L
CURRENT PHASE
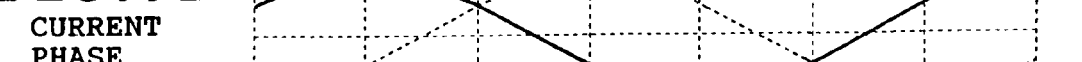
FIG. 9M
INVERTER OUTPUT VOLTAGE
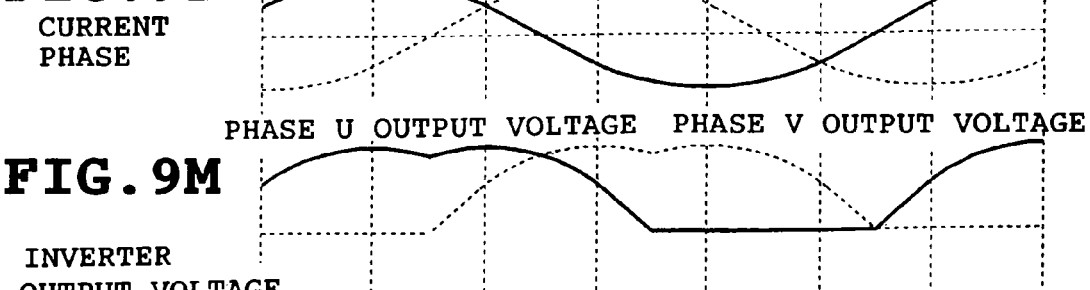
STATE OF FIELD WEAKENING

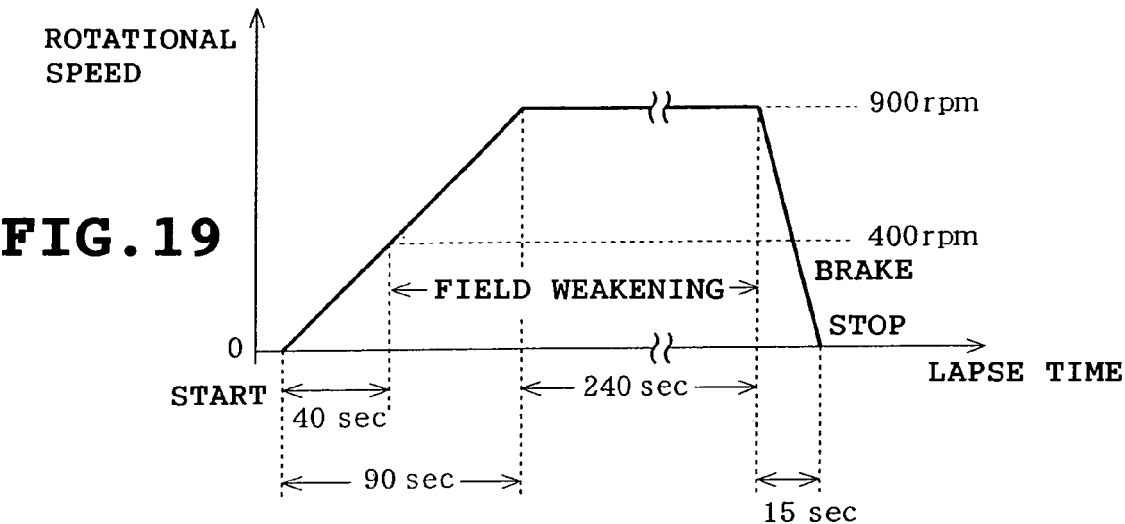
FIG. 19
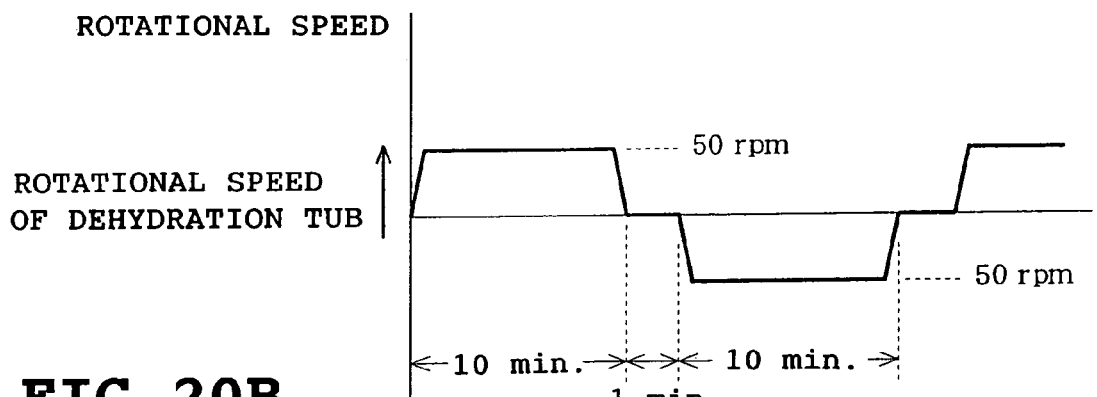
FIG. 20A
FIG. 20B

INVERTER FOR WASHER AND INVERTER FOR WASHER-DRIER

CROSS-REFERENCE TO RELATED APPLICATIONS

This application is the National Phase of International Application No. PCT/JP02/11635, filed Nov. 7, 2002, which designated the U.S. and was published on Jun. 19, 2003 as International Publication No. WO 03/050341 A1. That application is based upon and claims the benefit of priority from prior Japanese Patent Application No. 2001-380176, filed Dec. 13, 2001.

TECHNICAL FIELD

The present invention relates to an inverter for a washer controlling an electric motor imparting a rotational driving force required for washing, rinsing and dehydrating operations with respect to an automatic washing machine in which steps of wash, rinse and dehydration are consecutively carried out, and an inverter for a washer-drier controlling an electric motor imparting a rotational driving force required for washing, rinsing and dehydrating operations with respect to an automatic washing machine in which steps of wash, rinse and dehydration are consecutively carried out.

BACKGROUND ART

In automatic washing machines, DC brushless motors have conventionally been used as motors for rotating a mixing blade (pulsator) or a rotating tub when washing, rinsing and dehydrating operations are carried out. A system for driving the DC brushless motors by an inverter circuit has been employed widely. Voltage applied to the motor is increased or decreased when torque is controlled according to driving conditions of the motor. However, output torque controlled by the applied voltage is not proportional to voltage although a rotational speed of the motor is proportional to the output torque. As a result, a difference tends to be caused between a target speed command and a detected motor speed, whereupon the control tends to become unstable.

In view of the foregoing problem, the inventors proposed in Japanese Patent Application No. 2001-171185 the technique of controlling the output torque by a q-axis current by applying a vector control in order that the motor used in the washer or the like may be controlled with higher accuracy. More specifically, motor torque control and accordingly rotational speed control can be carried out with high accuracy since the output torque of the DC brushless motor is proportional to the q-axis current obtained by the vector control.

Motors used in the washers or washer-driers are controlled so as to be rotated at low speeds in the washing operation and so as to be rotated at high speeds in the dehydrating operation. Since induced voltage caused in a motor winding is raised during high speed rotation, drive voltage to be supplied also needs to be raised with rise of the induced voltage. Generally, however, the drive voltage which can be supplied has a definite limit when an electric motor is controlled by an inverter. Accordingly, a field weakening operation is carried out in the high speed rotation so that the number of revolution of the motor is increased while the induced voltage of the motor is restrained.

In the vector control technique proposed by Japanese Patent Application No. 2001-171185, an operation is performed according to a given speed command value and detected motor current value, whereupon drive voltage applied to the inverter circuit or the duty of PWM signal is determined. Thus, a level of actual drive voltage is unknown until the results of operation in the vector control are obtained. Accordingly, in the case where the field weakening operation is performed while the vector control is carried out, the d-axis current is changed from a full field (=0) state thereby to be set at a smaller value when it is determined that the PWM duty exceeds 90% (namely, 90% of the drive voltage).

More specifically, output voltage of an inverter circuit cannot be set to be approximately 100% when the field weakening operation is carried out. Accordingly, since the magnetic field needs to be weakened more as the voltage drops, the motor efficiency is reduced and the power supply current is inevitably increased. As a result, the inverter and motor become large-scale.

The present invention was made in view of the foregoing and an object thereof is to provide an inverter which can raise the output voltage in the case of the field weakening operation even when the vector control is introduced to the control of the motor used in the washer or washer-drier.

SUMMARY OF THE INVENTION

An inverter for a washer of the present invention comprising a control unit controlling a brushless DC supplying a rotational driving force for performance of washing, rinsing and dehydrating operations with respect to a full automatic washer in which steps of wash, rinse and dehydration are consecutively carried out, is characterized in that the control unit controls the motor so that the motor is operated with a full field in the washing and rinsing operations and a low-speed rotation region of the dehydrating operation and so that the motor is operated with a weak field in a high speed rotation region of the dehydrating operation, and in that the control unit controls an output torque of the motor in a vector control based on a current command generated according to a speed command when the full field operation is carried out and the control unit controls the motor in a voltage and phase control based on a voltage command and a phase command both generated according to the speed command when the field weakening operation is carried out.

Further, an inverter for a washer-drier of the present invention comprising a control unit controlling an electric motor supplying a rotational driving force for performance of washing, rinsing, dehydrating and drying operations with respect to a full automatic washer-drier in which steps of wash, rinse, dehydration and drying are consecutively carried out, is characterized in that the control unit controls the motor so that the motor is operated with a full field in the washing and rinsing operations and a low-speed rotation region of the dehydrating operation and so that the motor is operated with a weak field in a high speed rotation region of the dehydrating operation, and in that the control unit controls an output torque of the motor in a vector control when the full field operation is carried out and the control unit controls the motor in a voltage and phase control when the field weakening operation is carried out.

In short, in the high speed rotation region in which the field weakening operation needs to be performed, the control unit switches the control manner to the voltage and phase control without execution of the vector control. Accordingly, the output voltage of the inverter circuit does not exceed the voltage given as a command value. Consequently, the field weakening operation can be performed when the voltage supplied to the motor is set higher in the high speed rotation region of the dehydrating operation.

BRIEF DESCRIPTION OF THE DRAWINGS

FIGS. 7A and 7B show rotational speed control pattern for the agitator (motor) in the washing or rinsing operation and output pattern of q-axis current command value $I_{qref}$ delivered by a speed PI control section according to the rotational speed control pattern, respectively;

FIGS. 8A and 8B are views similar to FIGS. 7A and 7B, showing the case of the dehydrating operation, respectively;

FIGS. 9A to 9M explain the weak field control by lead angle, 9A to 9G showing the positional relationship between the stator winding and rotor magnet, 9H to 9J showing the full field control and 9K to 9M showing the weak field control;

FIG. 19 is a view similar to FIG. 15; and

FIG. 20A is a view similar to FIG. 16 and FIG. 20B is a view showing the rotation direction of the pulsator in a drying operation.

BEST MODE FOR CARRYING OUT THE INVENTION

Figure 1:
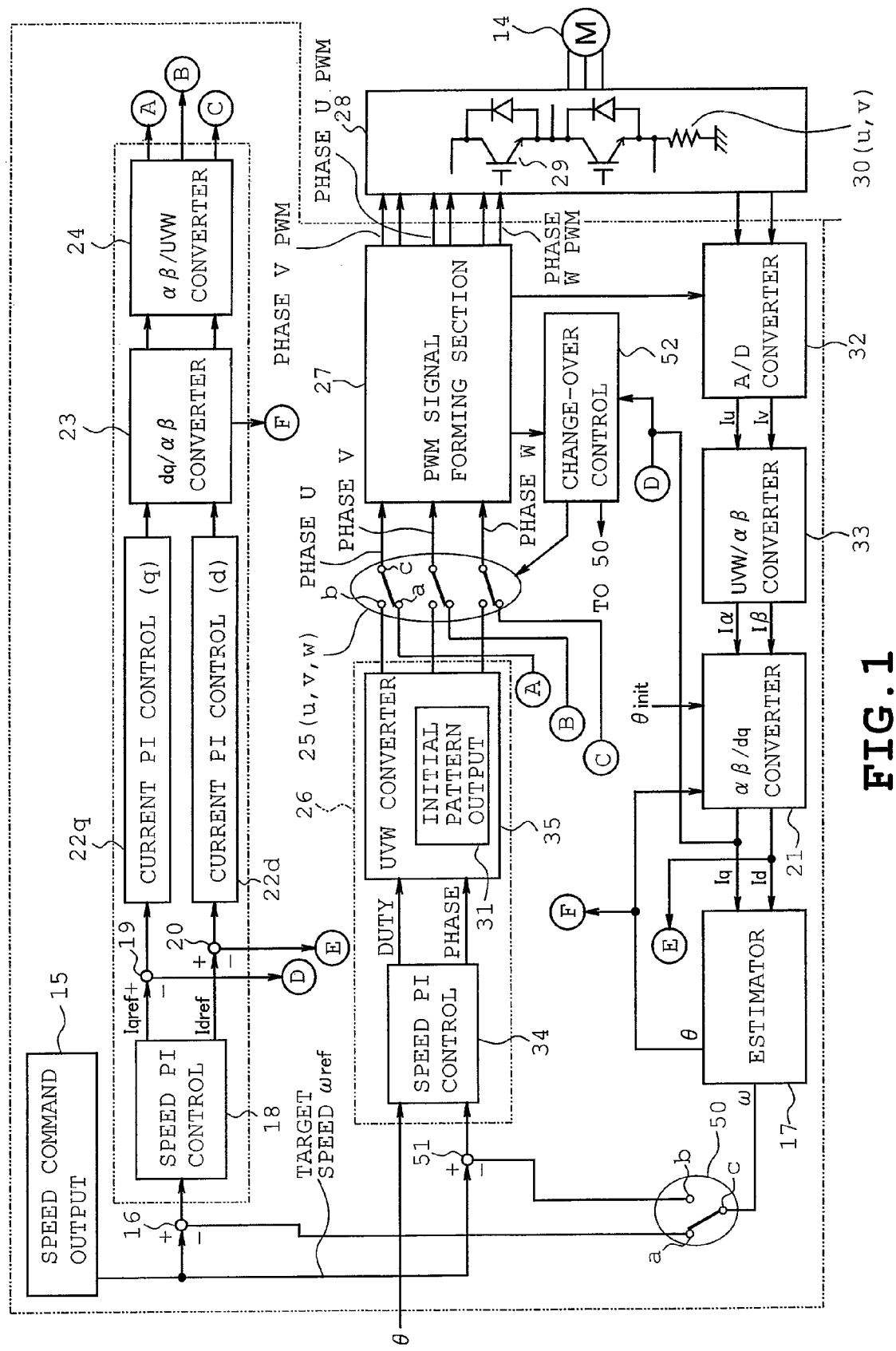
FIG. 1 is a block diagram of the control system mainly comprising a microcomputer, showing a first embodiment in which the invention is applied to a washer.

A first embodiment in which the present invention is applied to a vertical axis type full automatic washing machine will be described with reference to FIGS. 1 to 10. Firstly, FIG. 2 is a longitudinal section showing the overall washer. An outer cabinet 2 has a generally rectangular shape and a water-receiving tub 3 is elastically supported via four sets of vibration proofing mechanisms 4 (only one set is shown) in the water-receiving tub. Each set of vibration proofing mechanism 4 includes a suspension rod 4a having an upper end fixed to an upper portion of the cabinet 2 and the other end to which a vibration damper 4b is mounted. The water-receiving tub 3 is elastically supported via the vibration proofing mechanisms 4 such that the vibration produced in the washing operation is prevented from transmitting to the outer cabinet 2.

A rotating tub 5 serving both as a wash tub and as a dehydration tub is provided in the water-receiving tub 3. An agitator (pulsator) 6 is provided on the bottom of the rotating tub 5. The rotating tub 5 includes a tub body 5a, an inner cylinder 5b provided inside the tub body 5a and a balance ring 5c provided on upper ends of the tub body and inner cylinder. Upon rotation of the rotating tub 5, a rotational centrifugal force causes water to rise, whereupon the water is discharged through dehydration holes 5d formed in an upper portion of the tub body 5a into the water-receiving tub 3.

The bottom of the rotating tub 5 has a hole 7 communicating via a drain passage 7a with a drain hole 8. A drain valve 9 is provided in a drain passage 10 connected to the drain hole 8. Accordingly, when water is supplied into the rotating tub 5 with the drain valve 9 closed, the water is stored in the rotating tub 5. When the drain valve 9 is opened, the water stored in the rotating tub 5 is discharged through the drain passage 7a, drain hole 8 and drain passage 10.

The bottom of the water-receiving tub 3 has an auxiliary drain hole 8a connected to a connecting hose (not shown) to bypass the drain valve 9. The auxiliary drain hole 8a is further connected to the drain passage 10. Water discharged into the water-receiving tub 3 upon rotation of the tub 5 is further discharged through the auxiliary drain hole 8a.

A mechanism housing 11 is mounted on the underside of the water-receiving tub 3. A hollow tub shaft 12 is rotatably mounted on the mechanism housing 11. The rotating tub 5 is connected to the tub shaft 12. An agitator shaft 13 is rotatably mounted in the tub shaft 12. The agitator 6 is connected to an upper end of the agitator shaft 13. The agitator shaft 13 has a lower end connected to a rotor 14a of a brushless DC motor 14 of the outer rotor type. The brushless motor 14 directly drives the agitator 16 alternately in opposite directions in a wash step.

Further, the tub shaft 2 and the agitator shaft 13 are coupled by a clutch (not shown) so that the motor 14 directly drives the rotating tub 5 and agitator 6 in one direction. Accordingly, a rotational speed of the motor 14 is approximately equal to a rotational speed of the agitator 6 in the wash step and to rotational speeds of the tub 5 and agitator 6 in the dehydration step.

Figure 2:
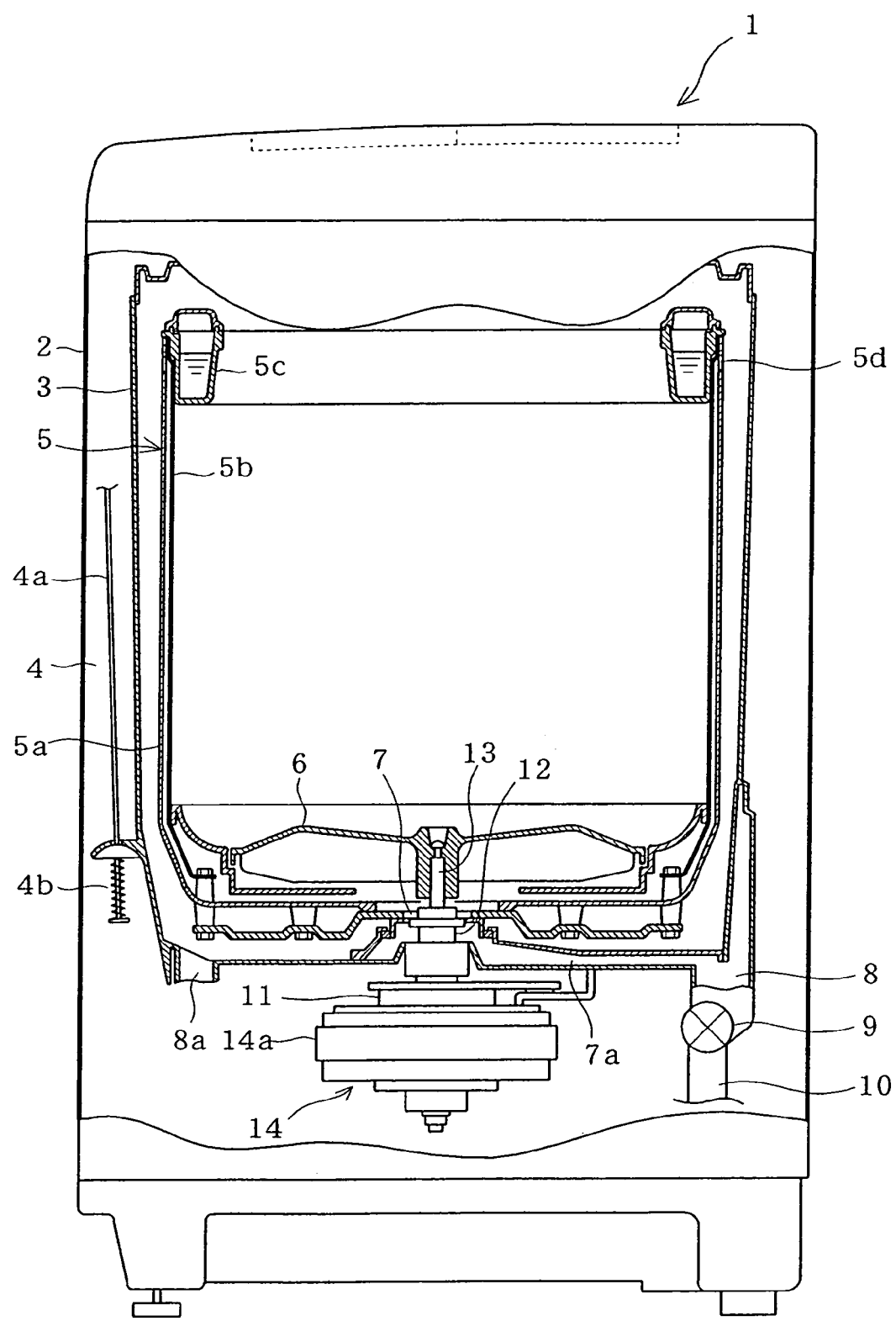
FIG. 2 is a longitudinal section of the washing machine.

FIG. 1 is a block diagram of the control system for the motor 14. In FIG. 1, coordinate ($\alpha$, $\beta$) represents a rectangular coordinate system obtained by orthogonal conversion of a three-phase coordinate system of three phases of the brushless motor 14 separated from each other by an electrical angle of 120 degrees. Coordinate (d, q) represents a coordinate system of a secondary magnetic flux revolved with rotation of the rotor 14a.

A speed command output 15 supplies a target speed command $\omega_{ref}$ as a subtracted value to a subtracter 16. An estimator 17 detects a detected speed $\omega$ of the brushless motor 14. The detected speed $\omega$ is supplied as a subtracting value through movable and fixed contacts 50c and 50a of a changeover switch 50 to the subtracter 16. A result of the subtraction by the subtracter 16 is supplied to a speed PI (proportional-integral) control 18.

The speed PI control 18 performs a PI control on the basis of the target speed command $\omega_{ref}$ and the detected speed $\omega$, thereby generating a quadrature axis (q-axis) current command value $I_{qref}$ and a direct axis (d-axis) current command value $I_{dref}$. Both current command values $I_{qref}$ and $I_{dref}$ are supplied as subtracted values to subtracters 19 and 20 respectively. When a vector control is carried out, the motor 14 is driven by a full field control with the d-axis current command value $I_{dref}$ being set at 0. An αβ/dq converter 21 generates a q-axis current value $I_q$ and a d-axis current value $I_d$, both of which are supplied as subtracting values to the subtracters 19 and 20 respectively. Results of the subtraction by the subtracters 19 and 20 are supplied to current PI controls 22q and 22d respectively. A control period in the speed PI control 18 is set at 1 ms.

The current PI controls 22q and 22d perform a PI control on the basis of a difference between the q-axis and d-axis current command values $I_{qref}$ and $I_{dref}$, thereby generating a q-axis voltage command value $V_q$ and a d-axis voltage command value $V_d$, respectively. The q-axis and d-axis voltage command values $V_q$ and $V_d$ are supplied to a dq/αβ converter 23. The estimator 17 detects a rotation phase angle θ of the secondary magnetic flux of the brushless motor 14 (a position angle of the rotor). The rotation phase angle θ is supplied to the dq/αβ converter 23, which converts the voltage command values $V_q$ and $V_d$ to voltage command values $V_α$ and $V_β$ on the basis of the rotation phase angle θ.

The voltage command values $V_α$ and $V_β$ supplied by the dq/αβ converter 23 are supplied to an αβ/UVW converter 24, which converts the voltage command values $V_α$ and $V_β$ to three-phase voltage command values $V_u$, $V_v$ and $V_w$. The three-phase voltage command values are supplied to one fixed contacts 25ua, 25va and 25wa of three change-over switches 25u, 25v and 25w respectively. Voltage command values $V_{us}$, $V_{vs}$ and $V_{ws}$ supplied by a voltage/phase control 26 are supplied to the other fixed contacts 25ub, 25vb and 25wb of the change-over switches 25u, 25v and 25w respectively. The change-over switches 25u, 25v and 25w further have movable contacts 25uc, 25vc and 25wc connected to input terminals of a PWM signal forming section 27 respectively.

The PWM signal forming section 27 modulates a carrier wave of 16 kHz on the basis of the voltage command values $V_{us}$, $V_{vs}$ and $V_{ws}$ to obtain PWM signals $V_{up}(+,-)$, $V_{vp}(+,-)$ and $V_{wp}(+,-)$ for the respective phases. The PWM signals $V_{up}(+,-)$, $V_{vp}(+,-)$ and $V_{wp}(+,-)$ are supplied to an inverter circuit 28. In order that sinusoidal current may be supplied to phase windings 14u, 14v and 14w (see FIG. 2) of the motor 14, each of the PWM signals $V_{up}$, $V_{vp}$ and $V_{wp}$ has a pulse width corresponding to voltage amplitude based on a sine wave.

The inverter circuit 28 includes six IGBTs 29a to 29f connected into a three-phase bridge configuration (only one phase is shown in FIG. 1). Lower arm side IGBTs 29c and 29d have emitters grounded via current-detecting shunt resistors 30u and 30v respectively and connected via an amplifier-bias circuit (not shown) to an A/D converter 32. The amplifier-bias circuit includes an operational amplifier and amplifies a terminal voltage of the shunt resistor 30 and biases the amplified signal so that an output range of the amplified signal falls within the positive side (for example, 0 to +5V).

An A/D converter 32 performs an A/D conversion of voltage signals appearing on emitters of the IGBTs 29c and 29d, obtaining current data Iu and Iv, which data are supplied to a UVW/αβ converter 33. The UVW/αβ converter 33 estimates phase W current data Iw from current data Iu and Iv and converts three-phase current data Iu, Iv and Iw into biaxial current data $I_α$ and $I_β$ of the orthogonal coordinates system according to the following equation:

$$\begin{bmatrix} I_α \\ I_β \end{bmatrix} = \begin{bmatrix} \cos(0) & \cos(2\pi/3) & \cos(4\pi/3) \\ \sin(0) & \sin(2\pi/3) & \sin(4\pi/3) \end{bmatrix} \begin{bmatrix} I_u \\ I_v \\ I_w \end{bmatrix} \quad (1)$$

The UVW/αβ converter 33 then supplies the biaxial current data $I_α$ and $I_β$ to an αβ/dq converter 21.

The αβ/dq converter 21 obtains a positional angle θ of the motor rotor from the estimator 17 to convert the biaxial current data $I_α$ and $I_β$ to d-axis current value Id and q-axis current value $I_q$ on a rotating coordinate system (d, q) according to the following equation (2):

$$\begin{bmatrix} I_d \\ I_q \end{bmatrix} = \begin{bmatrix} \cos θ & \sin θ \\ -\sin θ & \cos θ \end{bmatrix} \begin{bmatrix} I_α \\ I_β \end{bmatrix} \quad (2)$$

The αβ/dq converter 21 supplies the d-axis current value $I_d$ and the q-axis current value $I_q$ to the estimator 17 and subtracters 19 and 20. Based on the d-axis and q-axis current values $I_d$ and $I_q$, the estimator 17 estimates a position angle θ of the rotor 14a and rotational speed ω, supplying them to respective sections. In the starting of the motor 14, the direct current excitation is performed by the initial pattern output section 31 provided in the voltage/phase control 26 so that the rotational position of the rotor 14a is initialized. Thereafter, a starting pattern is applied so that forced commutation is carried out. The position angle θ is apparent in the forced commutation and accordingly, estimation is unnecessary. The αβ/dq converter 21 calculates current values $I_d$ and $I_q$ with a position angle $θ_{init}$ serving as an initial value. The position angle $θ_{init}$ is obtained from the initial pattern output section 31 immediately before start of the vector control.

After start of the vector control, the estimator 17 starts up to estimate the position angle θ and rotational speed ω of the motor rotor 14a. In this case, when the rotor position angle the estimator 17 supplies to the αβ/dq converter 21 is $θ_n$, the estimator estimates the rotor position angle $θ_n$ based on the rotor position angle $θ_{n-1}$ estimated by the vector calculation on the basis of the current values $I_d$ and $I_q$, and the rotor position angle $θ_{n-2}$ estimated one period before.

The voltage/phase control 26 includes a speed PI control 34 and a UVW converter 35. A subtracter 51 supplies to the speed PI control 34 a result of subtraction between a speed command $ω_{ref}$ generated by a speed command output 15 and the estimated speed ω supplied by the estimator 17. Based on the result of subtraction, the speed PI control 34 generates a voltage command (DUTY) and a phase command (PHASE), both of which are supplied to the UVW converter 35. A phase angle θ generated by the estimator 17 is supplied to the speed PI control 34 in order that a field weakening control may be performed as will be described later. The estimated speed ω is supplied via movable and fixed contacts 50c and 50b of a change-over switch 50 to the subtracter 51.

The UVW converter 35 converts a command value generated by the speed PI control 34 to three-phase voltage command values U, V and W, which values are supplied to the change-over switch 25. More specifically, the voltage/phase control 26 performs the similar control to that performed by the voltage/phase control system in conventional washing machines. The initial pattern output section 31 is provided in the UVW converter 35.

A change-over control 52 changes over the change-over switches 25 and 50. The change-over control 52 controls the change-over of the switches 25 and 50, based on duty information about a PWM signal supplied from the PWM signal forming section 27. Further, the change-over control 52 is designed to supply a command to the voltage/phase control 26 so that a field weakening control is carried out in a high-speed rotation area of the dehydrating operation as will be described later.

The foregoing arrangement except for the inverter circuit 28 is mainly realized by software of a microcomputer 36 serving as a controller. A current control period is set so as to be an inverse of the frequency of PWM carrier wave, 62.5 μsec.

Figure 3:
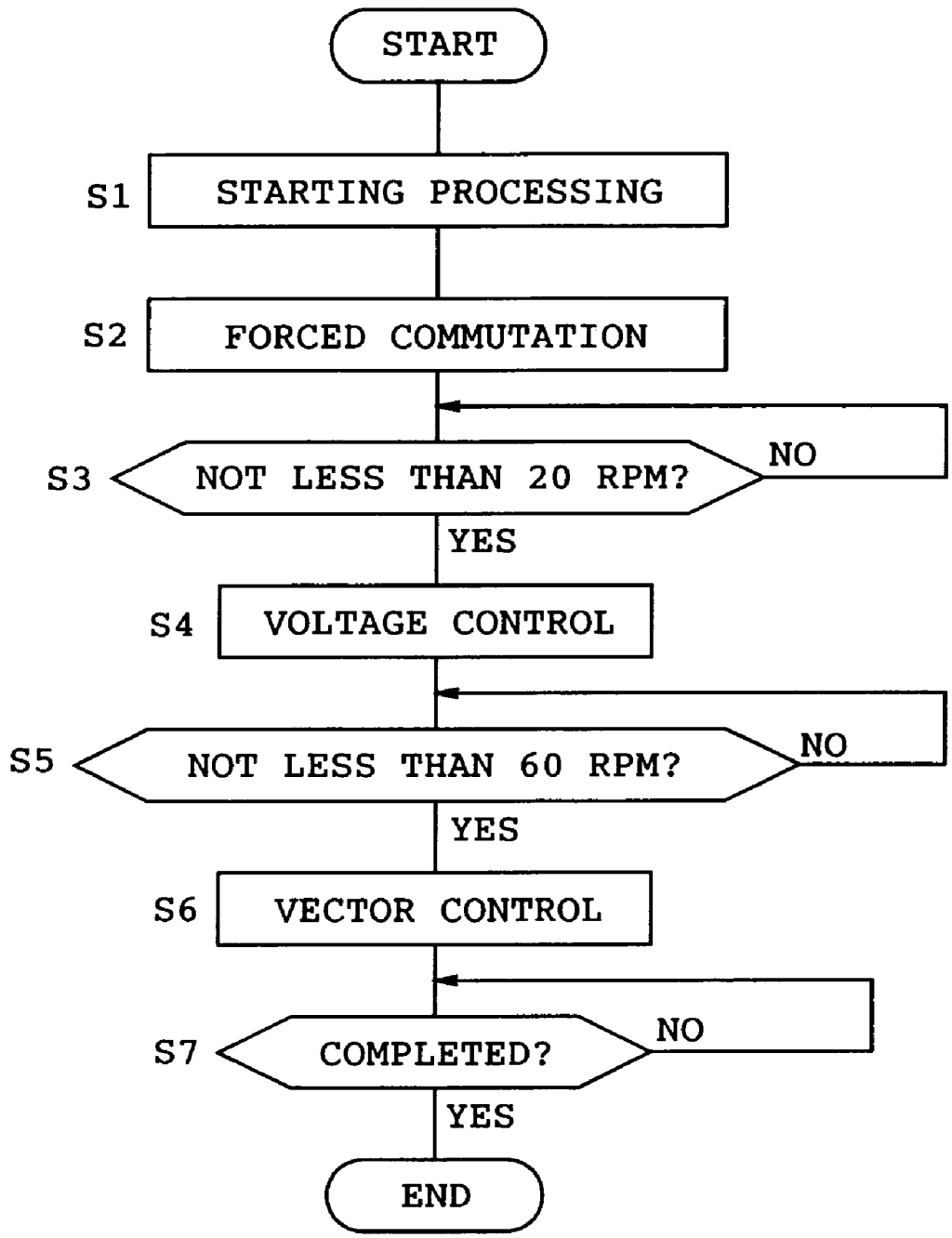
FIG. 3 is a flowchart showing control contents at an initial stage of the motor control by the microcomputer.

The operation of the washing machine of the embodiment will now be described with reference to FIGS. 3 to 13. FIG. 3 is a flowchart showing the control contents of the microcomputer 36. The microcomputer 36 carries out the foregoing start processing (step S1) when a washing operation starts, for example. More specifically, movable contacts 25uc to 25wc of the change-over switches 25u to 25w are changed over to the voltage/phase control 26 (fixed contacts 25ub to 25wb) side by the change-over control 52. Further, the movable contact 50c of the change-over switch 50 is changed over to the fixed contact 50b side. The microcomputer 36 then control the initial pattern output section 31 so that the direct current excitation is carried out. The rotational position of the rotor 14a is initialized and thereafter, the voltage command values $V_{us}$ to $V_{ws}$ are applied to the inverter circuit 28 so that the forced commutation takes place in the motor 14 (step S2). Consequently, the motor 14 starts rotating and the rotational speed thereof is gradually increased.

When determining that the motor speed has reached 20 rpm, on the basis of a signal supplied from the initial pattern output section 31 (YES at step S3), the microcomputer 36 changes over the change-over switches 25u to 25w so that the movable contacts 25uc to 25wc are connected to the fixed contacts 25ua to 25wa respectively. The microcomputer 36 further changes over the movable contact 50c of the change-over switch 50 to the fixed contact 50a side. The microcomputer 36 then starts supplying the target speed command $\omega_{ref}$, thus performing the voltage/phase control (PI control) (step S4). In other words, it is difficult to perform the vector control with high precision in a low speed range.

The microcomputer 36 then refers to the rotational speed ω supplied from the estimator 26 to determine whether the motor speed has reached 60 rpm (step S5). When determining that the motor speed has reached 60 rpm {YES at step S5}, the microcomputer 36 starts the vector control (and the speed PI control) (step S6). Thereafter, the microcomputer 36 continues the operation of the washing machine until receiving the instruction of operation stop (step S7): When a washing or rinsing operation is to be carried out in this while, the motor 14 is rotated in normal and reverse directions so that a maximum speed reaches 150 rpm.

Figure 5A:
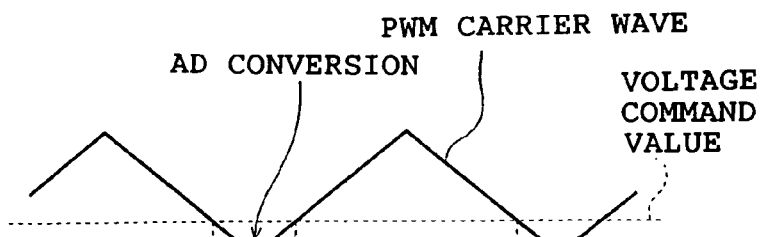
FIGS. 5A to 5C show waveforms of PWM carrier wave and upper and lower arm side gate signals respectively.
Figure 5B:
Figure 5C:
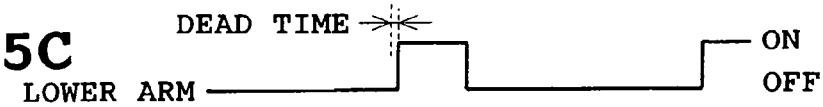

The processing in the vector control (and the speed PI control) after step S6 will be described. The PWM signal forming section 27 includes an internal up-down counter (not shown) generating a PWM carrier wave of 16 kHz. When a count value of the up-down counter has reached "0" or a trough of a triangular wave, the PWM signal forming section 27 supplies a conversion timing signal to the A/D converter 32. See FIG. 5A. The PWM signal forming section 27 compares the levels of the voltage command values $V_u$ to $V_w$ supplied by the αβ/UVW converter 24 with the level of the PWM carrier wave, as shown in FIGS. 5B and 5C. The PWM signal forming section 27 supplies the PWM signals $V_{up}(+)$, $V_{vp}(+)$ and $V_{wp}(+)$ so that the IGBTs 29a to 29c of the upper arm side are turned on in a period when the level of the PWM carrier wave is higher than those of the voltage command values $V_u$ to $V_w$. The IGBTs 29d to 29f of the lower arm side are turned on with a dead time between ON and OFF periods in a period when the IGBTs 29a to 29c of the upper arm side are turned off.

Figure 6A:
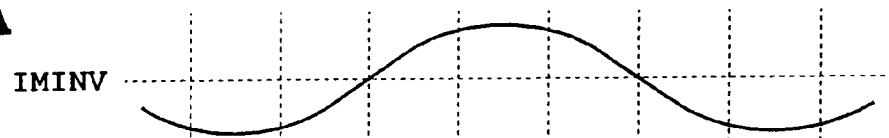
FIGS. 6A to 6C are waveform charts showing the relationship among inversion IMINV of motor phase current, current ISR flowing into a shunt resistance and phase current.
Figure 6B:
Figure 6C:

FIGS. 6A to 6C are waveform charts showing the relationship among inversion IMINV of motor phase current, current ISR flowing into the shunt resistor 30 and phase voltage. The IGBT 29 of the lower arm side is turned on so that the phase voltage is at 0 V in a period when the current ISR flows. Accordingly, the trough of the triangular wave shows an intermediate phase of the period when the IGBTs 29d to 29f are turned on. In other words, the phase current flowing into the lower arm side of the inverter circuit 28 can reliably be sampled when the A/D converter 32 performs the A/D conversion at the time when the count value of the PWM signal forming section 27 is 0.

The two-phase current values $I_u$ and $I_v$ converted by the A/D converter 32 are supplied through the UVW/αβ and αβ/dq converters 33 and 21 together with the estimated current value $I_w$ to be converted to biaxial current data $I_\alpha$ and $I_\beta$ and further to biaxial current data $I_d$ and $I_q$. The biaxial current data are supplied to the estimator 17 and the subtracters 19 and 20 so that the position angle θ and the rotational speed ω are estimated by the estimator. The current $I_q$ flows in a direction perpendicular to the direction of the secondary magnetic flux of the motor 14 and serves for torque development. On the other hand, the current $I_d$ flows in a direction in parallel with the direction of the secondary magnetic flux and does not serve for torque development.

The speed PI control 18 supplies q-axis and d-axis current command values $I_{qref}$ and $I_{dref}$ on the basis of the difference between the target speed command $\omega_{ref}$ and the detected speed ω. The current PI controls 22q and 22d supply voltage command values $V_q$ and $V_d$ on the basis of the differences between the command values $I_{qref}$ and $I_{dref}$ and the detected current values $I_q$ and $I_d$ respectively. The dq/αβ converter 23 and αβ/UVW converter 21 convert the voltage command values $V_q$ and $V_d$ to voltage command values $V_u$, $V_v$ and $V_w$, the latter being delivered to the PWM signal forming section 27. The PWM signal forming section 27 supplies PWM signals $V_{up}$, $V_{vp}$ and $V_{wp}$ to the inverter circuit 28. As a result, the motor phase windings are energized.

FIG. 7A shows a rotational speed control pattern for the agitator 6 (motor 14) in the washing or rinsing operation. The rotational speed is increased from 0 rpm to 150 rpm in 0.3 sec. and then maintained at 150 rpm for 0.5 sec. Continuously, the rotational speed is decreased from 150 rpm to 0 rpm in 0.3 sec. Subsequently, the rotational direction is revered after an interrupt period of 0.7 sec.

FIG. 7B shows an output pattern of a q-axis current command value $Iq_{ref}$ the speed PI control 18 supplies according to the rotational speed control pattern as shown in FIG. 7A. In this case, as described above, a d-axis current command value $Id_{ref}$ is set at "0" and the motor 14 is driven in a full field state.

Figure 4:
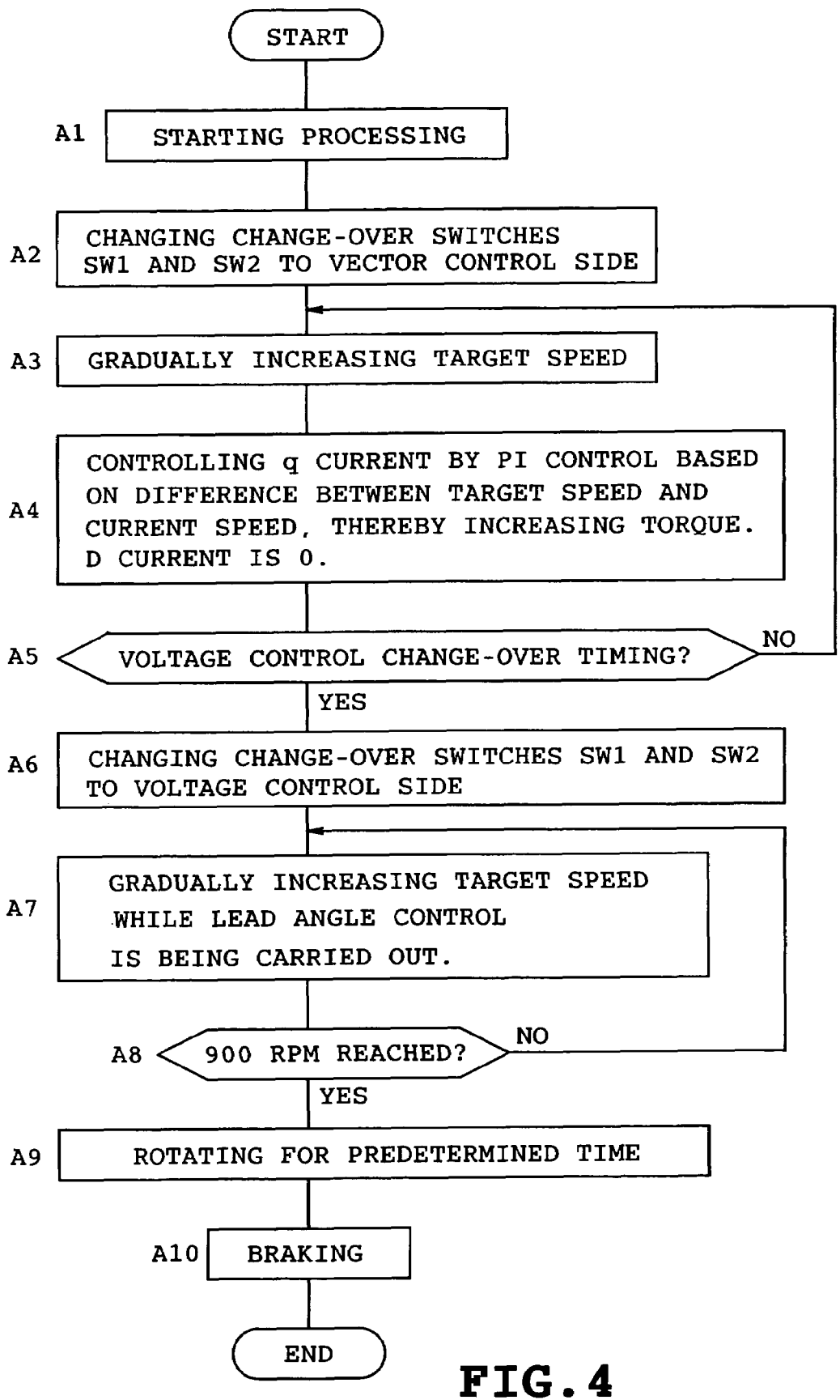
FIG. 4 is a view similar to FIG. 3, showing the case of the dehydrating operation.

FIG. 4 is a flowchart showing the control contents for the motor 14 in the dehydrating operation. The start processing of step A1 in FIG. 4 corresponds to steps S1 to S5 in FIG. 3. When the determination is made in the affirmative at step S5 in FIG. 3, the change-over control 52 changes over the change-over switches 50 and 25 to the vector control side (that is, the fixed contacts 50a and 25a side) (step A2).

FIGS. 8A and 8B are views similar to FIGS. 7A and 7B in the dehydrating operation, respectively. The rotational speed is increased from 0 rpm to 900 rpm in 90 sec. and then maintained at 900 rpm for 4 minutes in the dehydration as shown in FIG. 8A. The rotational speed is then decreased from 900 rpm to 0 rpm in 15 sec.

Accordingly, in FIG. 4, when the change-over control has been changed over to the vector control at step A2, the target rotational speed is gradually increased toward 900 rpm (steps A3 and A4). In this initial stage, the q-axis current command value $Iq_{ref}$ is supplied to the motor 14 so that the torque is increased, in the same manner as in the washing or rinsing operation, as shown in FIG. 8B. The d-axis current command value $Id_{ref}$ is set at "0" and the motor 14 is driven in the full field state.

The change-over control 52 then refers to information about duty of a PWM signal supplied from the PWM signal forming section 27 thereby to determine whether the timing has come to change over the vector control to the voltage/phase control (step A5). The change-over timing depends upon whether the duty of PWM signal has exceeded 90%. When the duty has not exceeded 90% (NO), the microcomputer returns to step A2. When the duty has exceeded 90% (YES), the microcomputer changes over the change-over switches 50 and 25 to the voltage/phase control (fixed contacts 50b and 25b side) (step A6) so that the voltage/phase control (PI control) is carried out by the speed PI control 34. In the example shown in FIG. 8, the duty of the PWM signal reaches 90% when the rotational speed of the motor 14 is increased to about 400 rpm.

In this case, furthermore, the change-over control 52 supplies a change-over signal also to the speed PI control 34 for execution of the weakening field control, the target speed of the motor 14 (speed command value $\omega_{ref}$) is further increased (step A7). The field weakening control is carried out by means of lead angle energization.

More specifically, FIGS. 9H to 9J show an energization timing (full field) providing a maximum efficiency of the motor 14 relative to phases P0 to P5 for every 60 degrees estimated by the estimator 17. In this case, the energization timing is shifted to the lead phase side by a phase command PHASE so that the field is weakened while voltage applied to the motor 14 is maintained at the level based on a voltage command (DUTY) supplied by the speed PI control 34 as shown in FIGS. 9K to 9M. FIGS. 9A to 9G show a positional relation between the stator winding and the rotor magnet in a case where the motor is rotated. The energization angle is set so as to be increased according to an increase in the speed command value $\omega_{ref}$, whereby induced voltage induced in the motor 14 is restrained.

At step A8 subsequent to step A7, the change-over control 52 determines whether the rotational speed of the motor 14 has reached 900 rpm. The change-over control 52 returns to step A7 when determining that the rotational speed has not reached 900 rpm (NO). When determining that the rotational speed has reached 900 rpm (YES), the change-over control 52 carries out the dehydrating operation for a predetermined period of time (four minutes, in this case) (step A9). Subsequently, the change-over control 52 stops energization to the motor 14 and operates a braking mechanism (not shown) to stop the rotor thereby to stop the rotating tub 5 (step A10), completing the processing.

Figure 10:
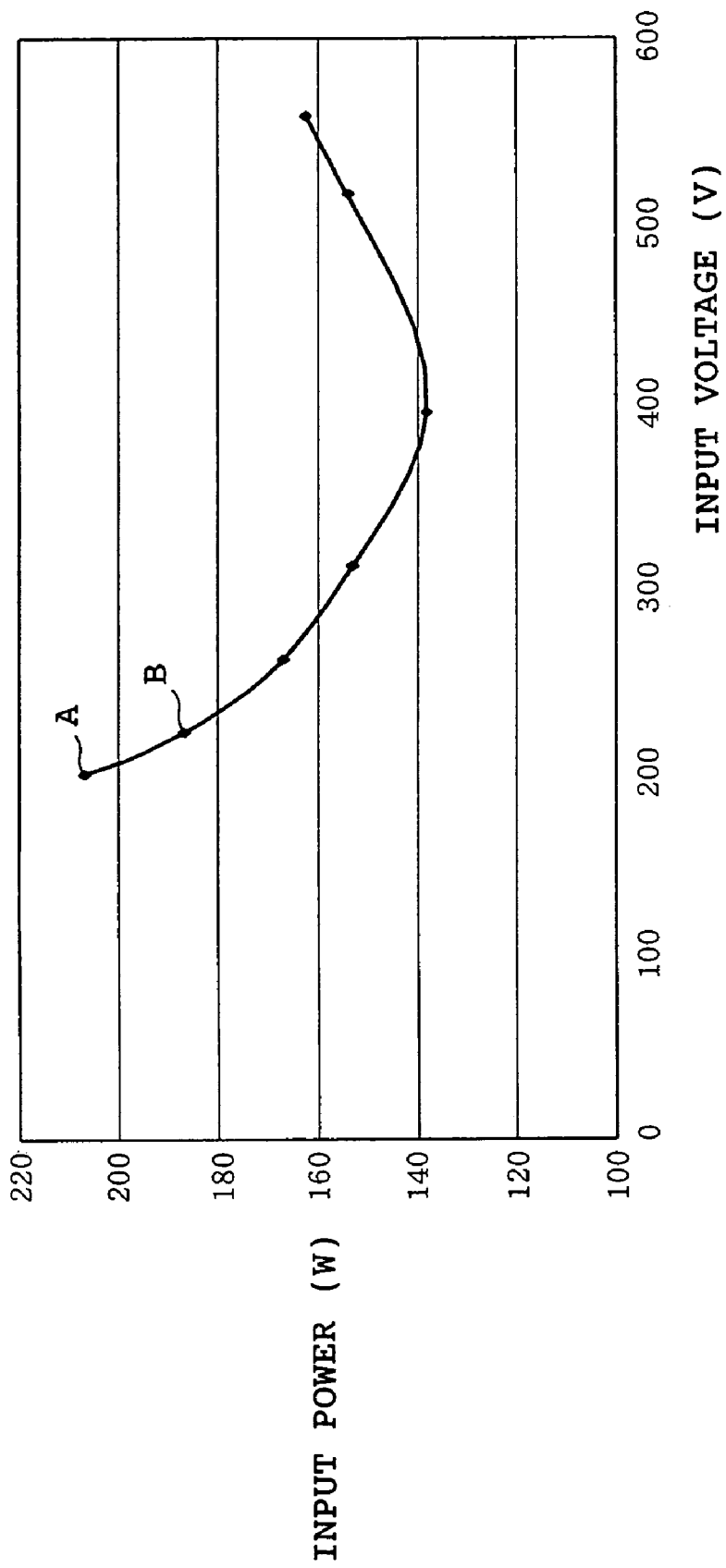
FIG. 10 shows the relationship between voltage (V) applied to the motor and input power (W) when the motor is driven at the maximum rotational speed in the dehydrating operation.

FIG. 10 shows the relationship between voltage (V) applied to the motor 14 and input power (W) in a case where the dehydrating operation is carried out at maximum speed of 900 rpm. Point A in FIG. 10 indicates a case where the field weakening control is carried out simultaneously with the vector control. In this case, applied voltage is 200 V and input power is about 208 W. On the other hand, point B indicates a case where the field weakening control is carried out simul- taneously with the voltage/phase control. In this case, applied voltage rises to about 220 V and input power drops to about 185 W. More specifically, the applied voltage can be raised when the control manner in the high-speed rotation area is changed over from the vector control to the voltage/phase control, the input power can be reduced about 10%.

According to the foregoing embodiment, the motor 14 is operated in the full field mode in the washing, rinsing and low-speed rotation area of the dehydrating operation. The motor 14 is operated in the field weakening mode in the high-speed rotation area of the dehydrating operation. The vector control is carried out for the output torque of the motor 14 when the full field operation is executed, whereas the voltage/phase control is carried out for the motor 14 when the field weakening operation is executed. Accordingly, the field weakening operation can be performed while the voltage applied to the motor 14 is set at a higher value in the high speed rotation area in execution of the dehydrating operation. Consequently, the consumed power can be reduced and accordingly, the efficiency can be improved.

No demerit arises even when the control manner in the high-speed rotation area in which the field weakening operation is carried out is changed over from the vector control to the voltage/phase control. When the output torque of the motor 14 is controlled by the vector control, the control response to the target value of rotational speed is rendered quick and accurate, whereupon the vibration is reduced. This effect can be achieved mainly in the low-speed rotation area. The reason for this is that the control performance of the vector control is reduced since the output voltage is saturated in the high-speed rotation area and that a resonant frequency peculiar to the washing machine belongs to the low-speed rotation area.

Accordingly, even when the control manner is changed to the voltage/phase control in the high-speed rotation area, the effect originally achieved from the vector control would not be lost. The field weakening operation can be carried out while the voltage supplied to the motor 14 is set at a high value.

FIGS. 11 to 16 illustrate a second embodiment in which the invention is applied to a full automatic washer-drier. Identical or similar parts in the second embodiment are labeled by the same reference symbols as those in the first embodiment and the description of these parts will be eliminated. Only the differences will be described in the following.

Figure 11:
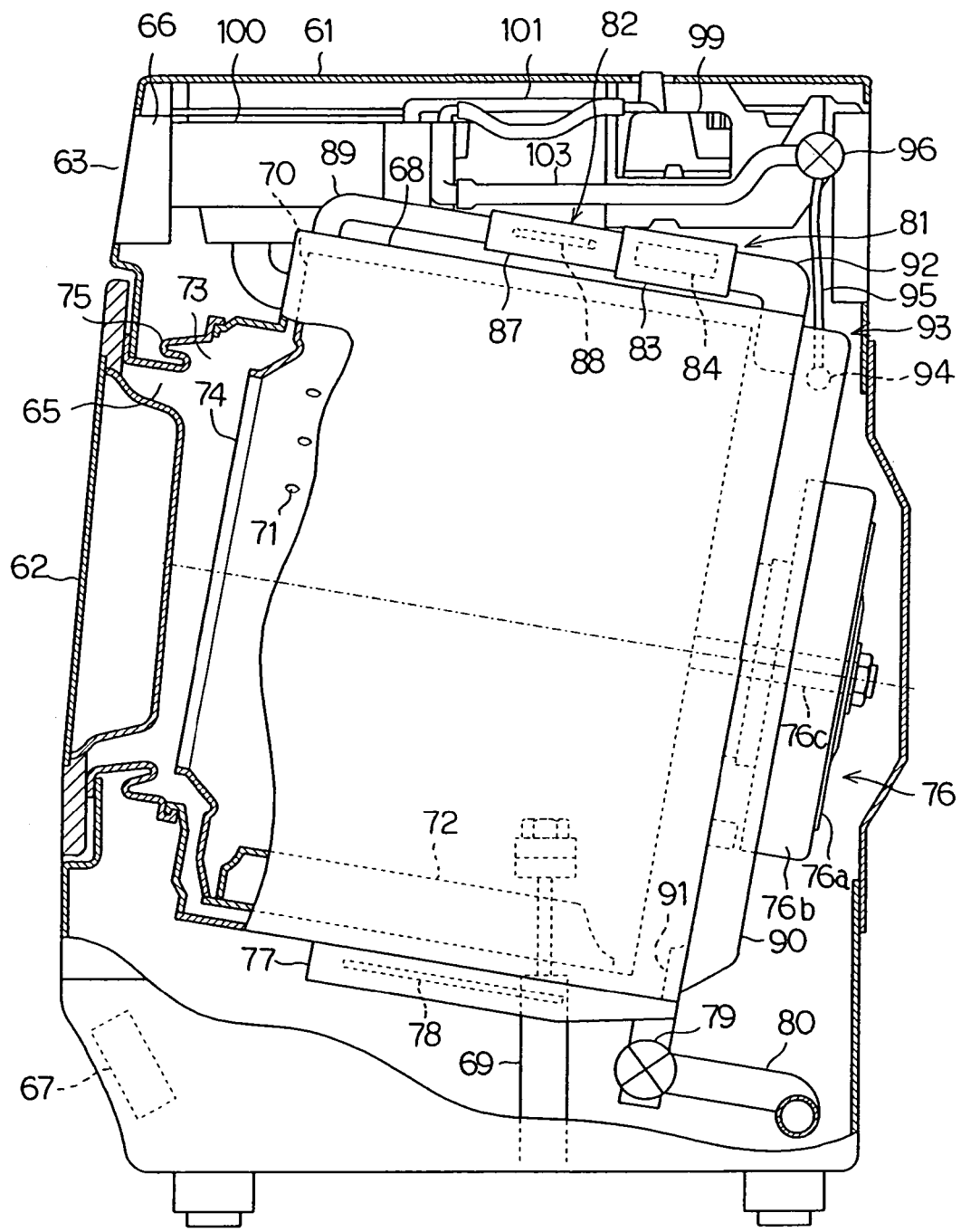
FIG. 11 is a longitudinal section of the drum washer-drier in accordance with second embodiment of the invention.

FIG. 11 is a longitudinally sectional side view of the drum washer-drier. A door 62 is mounted on a central front of an outer cabinet 61 serving as an outer shell of the drum washer-drier. An operation panel 63 and a detergent supply case (not shown) are provided in an upper part of the front of the outer cabinet 61. A laundry access opening 65 formed in the central part of the front of the outer cabinet 61 is closed and opened by the door 62. An operating circuit unit 66 is provided on an upper part of the front inside of the outer cabinet 61 (the inside of the operation panel 63). An operation circuit unit 67 is provided on a lower part of the front inside of the outer cabinet 61.

A water tub 68 is provided in the outer cabinet 61. The water tub 68 is formed into a cylindrical shape and its axis extends back-and-forth (right-and-left in FIG. 11). The water tub 68 is inclined frontwardly upward. The water tub 68 is supported by a pair of right and left elastic support devices 69.

A drum (dehydrating tub) 70 is provided in the water tub 68 so as to be coaxial with the latter. The drum 70 functions as a tub commonly used for washing, dehydration and drying. The drum 70 has a number of small holes 71 formed substantially in an overall area of a drum part (only a part of small holes are shown in FIG. 11). An inner circumferential face of the drum part has a plurality of baffles 72 (only one of the baffles is shown in FIG. 11). Upon rotation of the drum 70, the baffles 72 scrape laundry therein.

The water tub 68 and drum 70 have access openings 73 and 74 formed in the fronts so that laundry is put into and taken out of the drum through the access openings, respectively. The access opening 73 of the water tub 68 communicates through bellows 75 with the access opening 65 of the outer cabinet 61 (in a watertight manner). The opening 74 of the drum 70 confronts the opening 73 of the water tub 68 so that the access opening 65 communicates with the interior of the drum 70.

An electric motor 76 for driving the drum 70 is provided on a rear of the water tub 68. The motor 76 comprises a brushless DC motor of the outer rotor type as the motor 14. A stator 76a is mounted on the rear of the water tub 68. A rotating shaft 76c is disposed at the center of a rotor 76b and extends into the water tub 68. The rotating shaft 76c has a front end on which the central rear of the drum 70 is mounted.

A water reservoir 77 is mounted on the underside of the water tub 68. A heater 78 for heating wash water is provided in the water reservoir 77. A drain hose 80 is connected via a drain valve 79 to a rear of the water reservoir 77. The drain valve 79 is an electrically driven type and is opened by an electromagnet, motor or the like.

A blower 81 is provided on the upper rear of the water tub 68 and a heater 82 is provided on the upper front of the water tub 68. The blower 81 includes a blowing blade 84 provided in a casing 83, an electric motor 85 (see FIG. 12) driving the blowing blade 84 and provided outside the casing 83 and a belt transmission mechanism (not shown) provided between the blowing blade 84 and the motor 85. On the other hand, the heater 82 includes a hot air producing heater 88 provided in the casing 87. The casing 87 has an entrance communicating with an exit of the casing 83 of the blower 81.

A duct 89 is provided on the upper front of the water tub 68 and has one end communicating with an exit of the casing 87 of the heater 82 and the other end confronting the water tub 68.

A heat exchanger 90 is provided on the rear of the water tub 68. The heat exchanger 90 is of the water cooling type in which water is poured from an upper part so that heat exchange occurs between the poured water and water content of air flowing from the lower interior, whereby air is cooled and then evaporated thereby to be dehumidified. The heat exchanger 90 is generally hollow and curved concentrically with the rotating shaft 76c of the motor 76 serving as rotation center of the drum 70. Thus, the heat exchanger 90 is disposed so as to keep away from the motor 76.

The heat exchanger 90 has an air inlet 91 which is formed in its lower part and also serves as a water outlet. The air inlet 91 communicates with the lower interior of the water tub 68. The heat exchanger 90 has an upper part which communicates through a duct 92 with the casing 83 of the blower 81. A drying unit 93 includes the heat exchanger 90, duct 92, blower 81, heater 82 and duct 89.

A water pipe 94 extends across the upper interior of the heat exchanger 90. The water pipe 94 has a row of spouts (not shown) formed in the underside thereof confronting a lower part of the heat exchanger 90. The water pipe 94 has an end located outside the heater exchanger 90. The end of the water pipe 94 is connected to one end of a water tube 95, whereas the other end of the water tube 95 is connected to a water-supply valve 96 provided in the uppermost interior of the outer cabinet 61.

Figure 12:
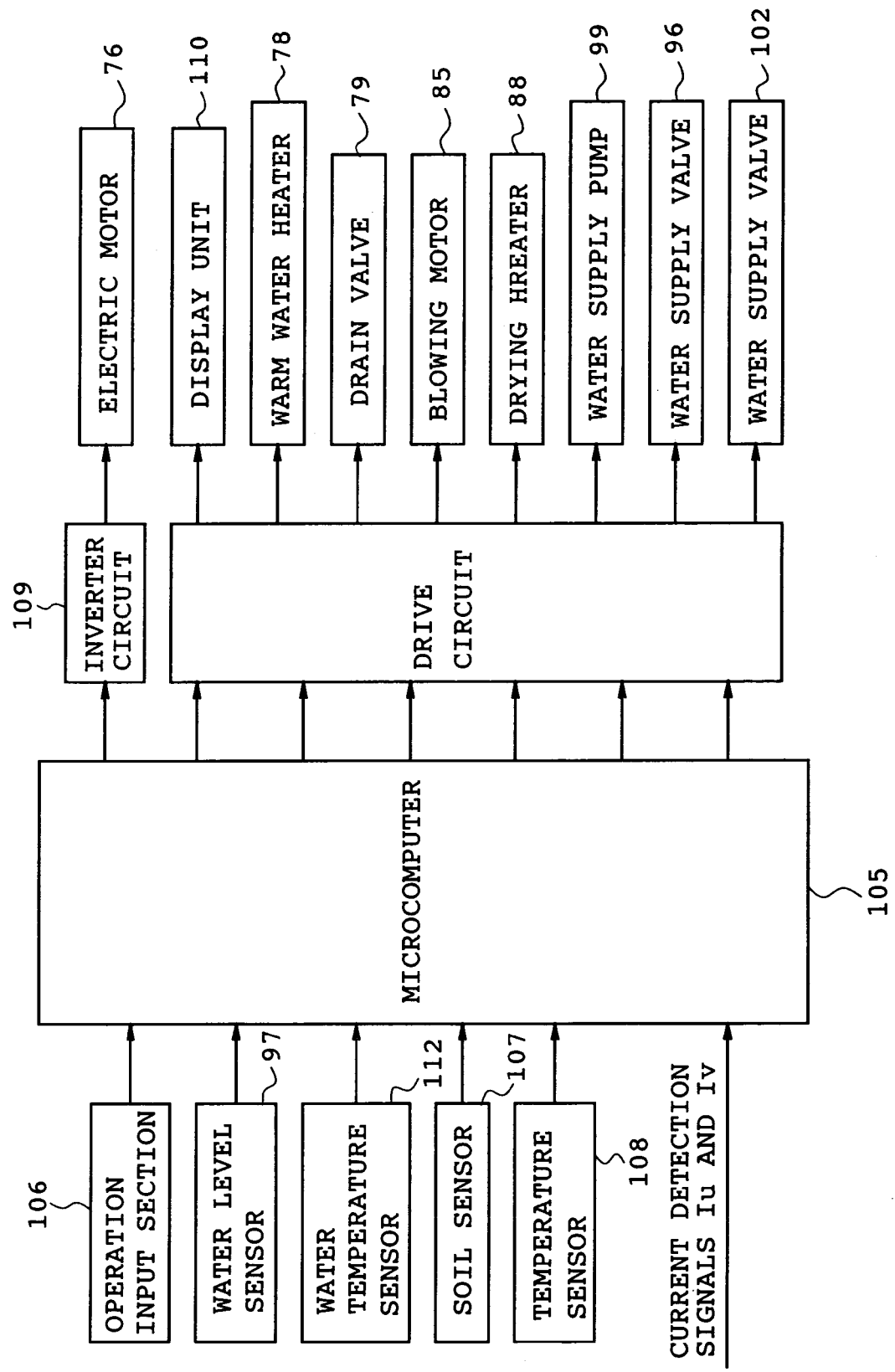
FIG. 12 is a block diagram showing electrical arrangement of the microcomputer and its peripheral components.

A water level sensor 97 is provided in the uppermost interior of the outer cabinet 61 (see FIG. 12). The water level sensor 97 detects a water level in the water tub 68 on the basis of air pressure transferred from an air trap (not shown) via an air tube. The water tub 68 communicates via the small holes 71 with the drum 70, whereupon water is reserved in the drum 70 through the small holes 71 when the water is reserved in the water tub 68. Accordingly, the water level sensor 97 and the air trap and air tube also detect the water level in the drum 70.

A water supply pump 99 is provided in the uppermost interior of the outer cabinet 61. The water supply pump 99 sucks water other than from the water supply system, such as bathwater, via a suction hose and discharges the water. A water case 100 is provided in the uppermost front of the interior of the outer cabinet 61. The water case 100 receives the water discharged from the water supply pump 99 via a connecting hose 101. Furthermore, the water case 100 also receives water supplied a faucet and a water supply valve 102 (see FIG. 12) from the water supply system (not shown) via a connecting hose 103. The aforesaid detergent case is enclosed in the water case 100, and the front bottom of the water case 100 communicates via the water pipe 94 into the water tub 68.

In the foregoing construction, when water from the water supply system is supplied via the water supply valve 99 and the connecting hose 103 into the water case 100, water from the water supply system is supplied via the detergent case and water pipe 94 into the water tub 68. The water is further supplied through the small holes 71 into the drum 70. Accordingly, when supplied into the detergent case, the detergent is supplied into the drum 70 with the water. On the other hand, the water other than from the water supply system supplied via the connecting hose 101 by the water supply pump 99 into the water case 100 is supplied through the water pipe 94 into the water tub 68 (drum 70) directly (without passing through the detergent case).

The water supply valves 102 and 96 and drain valve 79 are of the motor-operated type.

FIG. 12 shows an electrical arrangement comprising a microcomputer 105 (control means) and the periphery thereof. The microcomputer 105 is contained in the control circuit unit 67 and controls an overall operation of the drum washer-drier. Various operation signals are supplied to the microcomputer 1 from an operation input section 106 including various switches on the operation panel 63. The operation input section 106 is contained in the operation circuit unit 66 and supplies various operation signals according to the operation made by the user on the operation panel 63.

A water level signal is supplied from the water level sensor 97 to the microcomputer 105 and a soil signal is supplied to the microcomputer 105 from a soil sensor 107 provided for detecting soil of washing liquid in the water tub 68. Further, a temperature sensor 108 (thermistor) detecting a temperature in the drum 70 supplies a temperature signal to the microcomputer 105. A water temperature sensor 112 detects a temperature of the water in the water tub 68 and supplies a water temperature signal to the microcomputer 105.

Based on a current signal supplied to an A/D converter 32 and a previously stored control program, the microcomputer 105 supplies a drive control signal to an inverter circuit 109 driving the motor 76. The arrangement in which the microcomputer 105 controls the inverter circuit 109 and further accordingly the motor is the same as that as shown in FIG. 1 in the first embodiment.

Further, the microcomputer 105 supplies drive control signals to a drive circuit 111 for driving a display unit 110 comprising display sections of the operation panel 63, a hot water heater 78 for heating wash liquid, drain valve 79, blowing motor 85 for the blower 81, hot air heater 88, water supply pump 99 and water supply valves 96 and 102.

Figure 13:
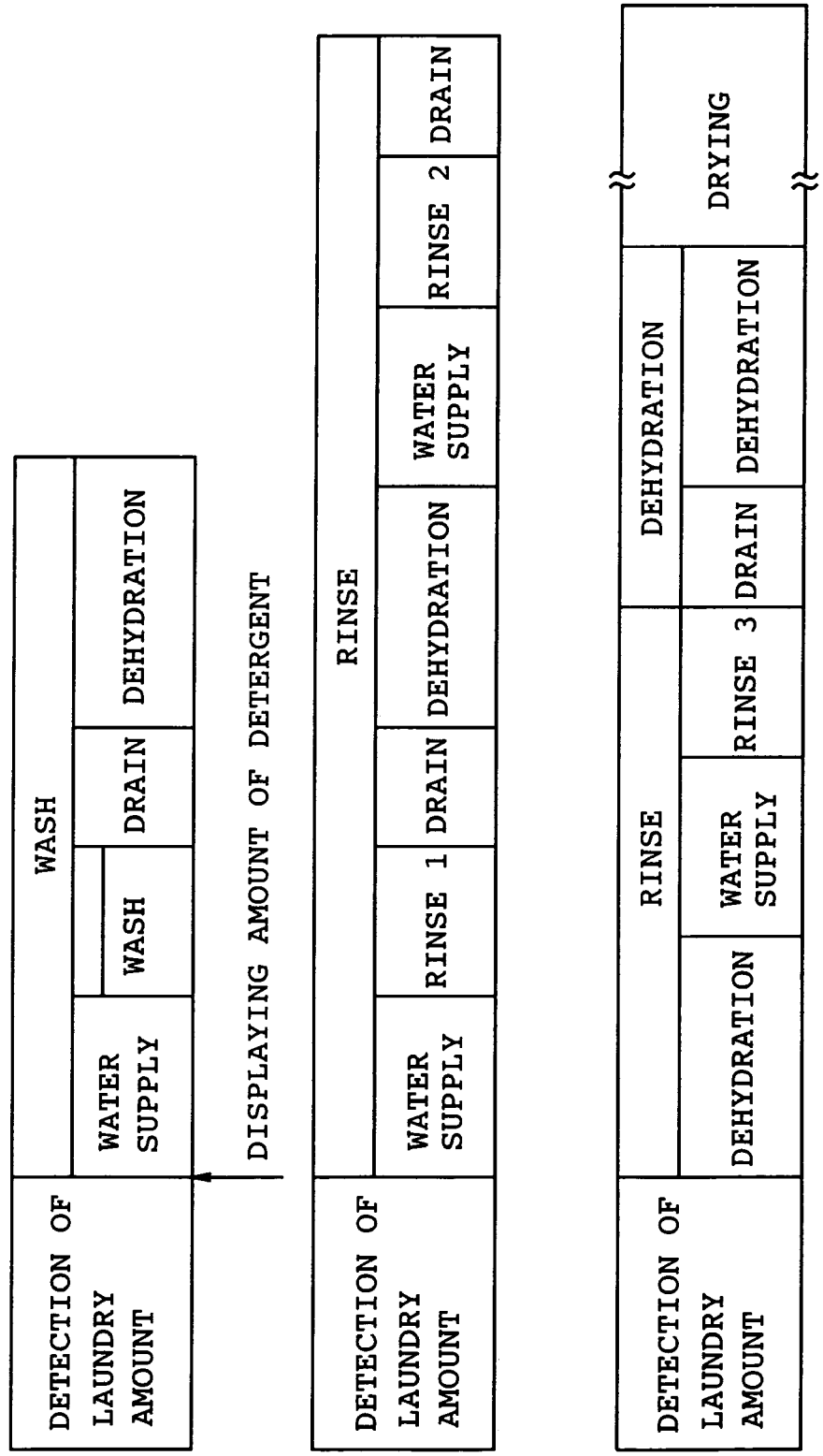
FIG. 13 shows sequential steps of the washer-drier.

The operation in the embodiment will now be described with further reference to FIGS. 13 to 16. FIG. 13 shows a sequence of steps of the washer-drier. Firstly, laundry amount detection is carried out in order that an amount of laundry the user has put into the drum 70 may be estimated. As a result, an amount of detergent to be dispensed is displayed on the display unit 60. When viewing the display, the user puts the detergent into the detergent case. At the same time, when water supply is carried out until a water level corresponding to an amount of laundry is reached, the drum 70 is rotated by the motor 76 repeatedly alternately in the normal and reverse directions. In this case, the heater 78 is energized when WARM-WATER WASHING is selected by the user.

When DRAIN and DEHYDRATION are executed at a final stage of the wash step, the control sequence subsequently advances to a rinse step. RINSE 1 starts after WATER SUPPLY has been carried out. After RINSE 1, a set of DRAIN, DEHYDRATION, DRAIN and RINSE is repeated twice. Thus, RINSE is executed three times. The control sequence then advances to a dehydration step in which DRAIN and DEHYDRATION are carried out. Thereafter, the control sequence advances to a drying step in which the drum 70 is rotated and the heater 88 is energized. The motor 85 is rotated so that hot air is circulated in the drum 70.

Figure 14:
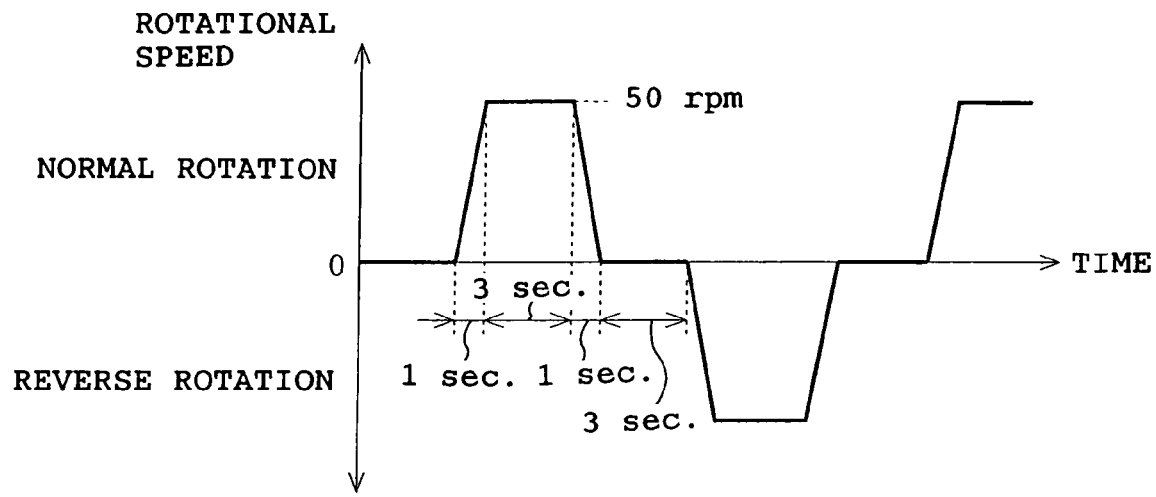
FIG. 14 shows motor rotational speed control pattern in the washing or rinsing operation.
Figure 15:
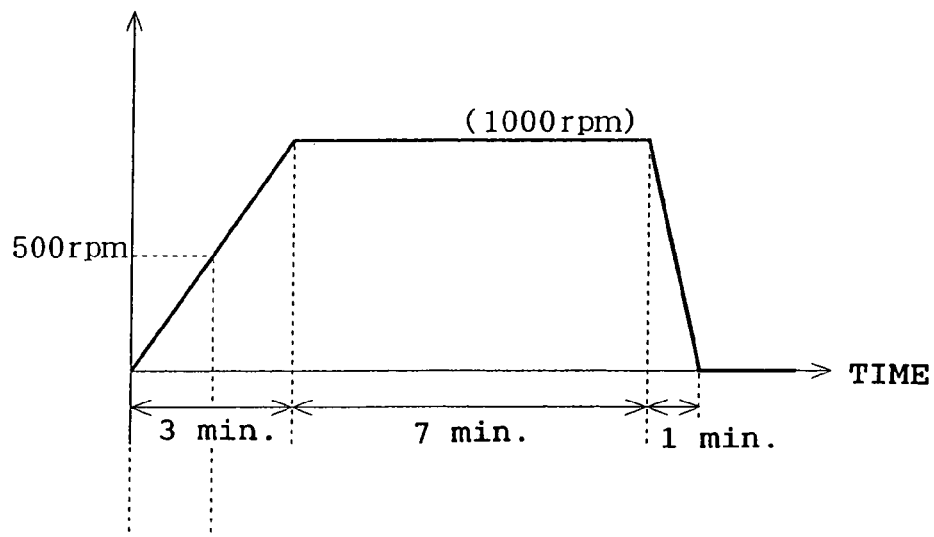
FIG. 15 is a view similar to FIG. 14, showing the case of the dehydrating operation.
Figure 16:
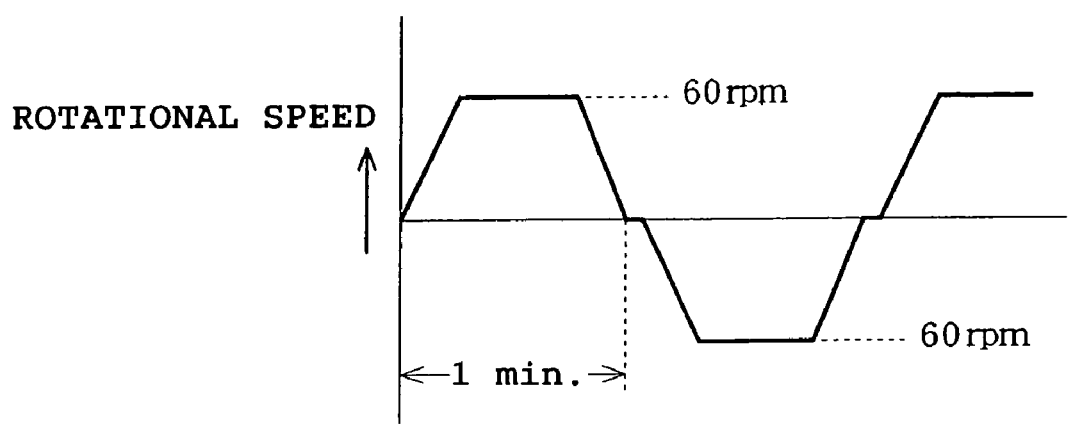
FIG. 16 is a view similar to FIG. 14, showing the case of the drying operation.

FIGS. 14 to 16 show control patterns for the rotational speed of the drum 70 (or motor 76) in the wash or rinse, dehydration and drying. In the wash or rinse as shown in FIG. 14, the rotational speed is increased from 0 rpm to 50 rpm in one second and maintained at 50 rpm for 3 seconds. The rotational speed is then decreased from 50 rpm to 0 rpm in one second. The direction of rotation is reversed after 3-second's stop. This pattern is repeatedly carried out. In this case, the output torque of the motor 76 is controlled on the basis of the q-axis current command value $Iq_{ref}$ by the vector control. The rotational speed is controlled by the PI control in which the full field control is executed with d-axis current command value $Id_{ref}$ being set at 0.

In the dehydration as shown in FIG. 15, the rotational speed is increased from 0 rpm to 1000 rpm in 3 minutes and maintained at 1000 rpm for 7 minutes. The rotational speed is then decreased from 1000 rpm to 0 rpm in one minute. In this case, too, the control is carried out in accordance with the flowchart of FIG. 4 in the same manner as in the first embodiment. As a result, when the duty of the PWM signal exceeds 90% (for example, 500 rpm), the control manner is changed from the vector control to the voltage/phase control, and the field weakening control is carried out by way of the lead angle energization as shown in FIG. 9.

In the drying as shown in FIG. 16, the rotational speed is increased to 60 rpm and maintained at 60 rpm. The rotational speed is continuously decreased from 60 rpm to 0 rpm. It takes one minute to increase and decrease the rotational speed in the above-described manner. The direction of rotation is reversed after a slight stop period. This pattern is repeated. In this case, torque is controlled by the vector control and the rotational speed is controlled by the PI control in the same manner as in the washing or rinsing operation. The field weakening control is carried out.

According to the second embodiment, the motor 76 is operated under the full field control in the washing and rinsing operations and low-speed rotation area of the dehydrating operation, whereas the motor 76 is operated under the field weakening control in the high-speed rotation area of the dehydrating operation. The vector control is carried out for the control of the output torque of the motor 76 when the full field operation is executed. The voltage/phase control is carried out for the motor 76 when the field weakening operation is executed. Accordingly, the same effect can be achieved in the washer-drier as in the first embodiment.

Figure 17:
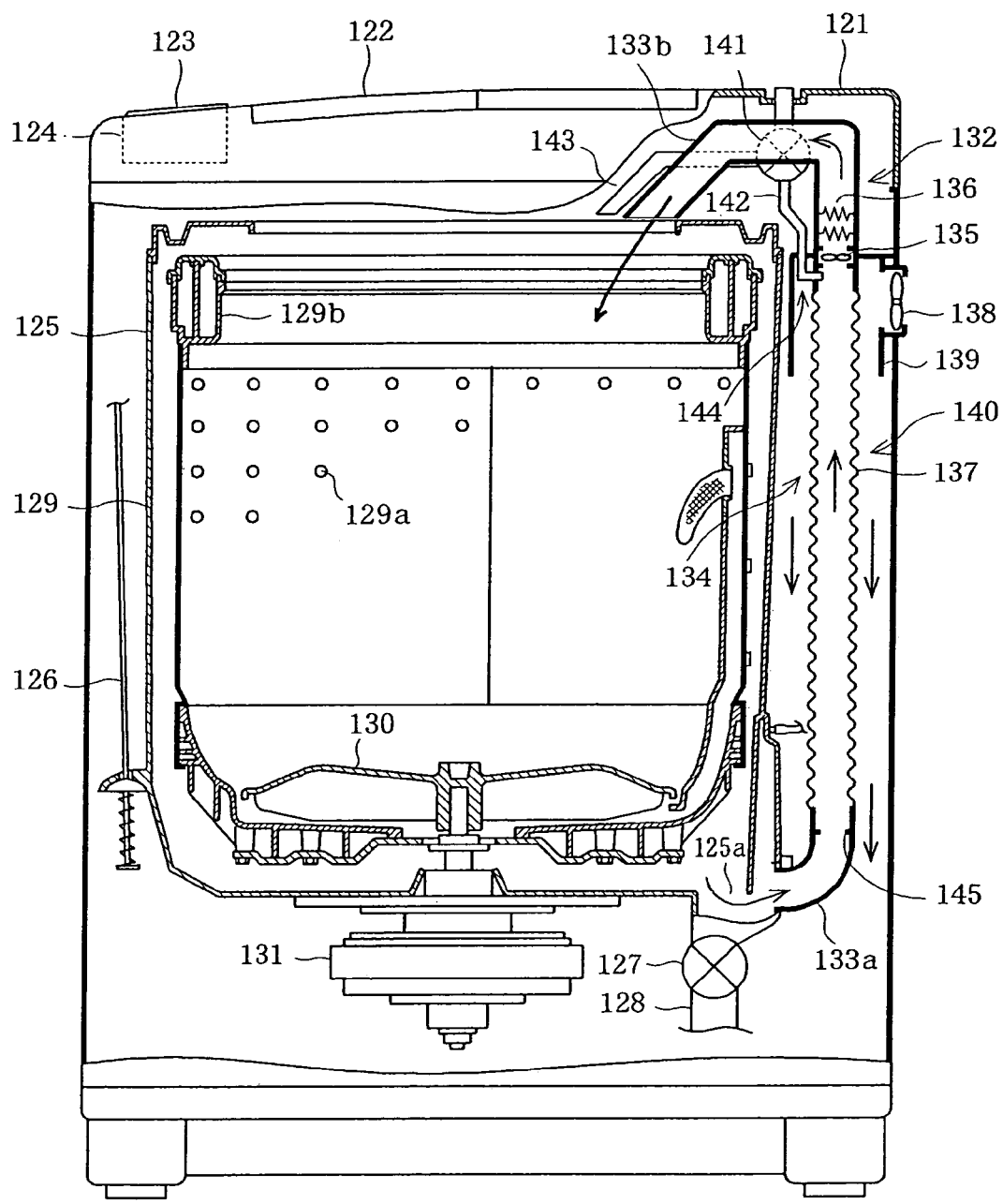
FIG. 17 is a view similar to FIG. 2, showing a third embodiment where the invention is applied to a vertical axis type washer-drier.

FIGS. 17 to 20 illustrate a third embodiment in which the invention is applied to a washer-drier of the vertical axis type. FIG. 17 is a longitudinal section of the washer-drier. A lid 122 is provided for opening and closing the access opening through which laundry is put into and taken out of the rotating tub. The lid 122 is mounted on the central top of the body 121 constituting the outer shell. An operation panel 123 having various selecting switches is provided in the front of the body 121. A control device 124 (control means) controls the overall washing and drying operations and comprises a microcomputer-based circuit. The control device 124 is provided inside the body 121 so as to correspond to the operation panel 123.

A water tub 125 has an upper opening and is formed into the shape of a bottomed cylinder and can reserve water. The water tub 125 is mounted on a plurality of elastic supporting devices 126 (only one being shown) in the body 121. A drain hole 125a is located at a lowermost portion of the water tub 125. A drain valve 127 is connected to the drain hole 125a. Further, a drain hose 128 having one end side extending outside the machine is connected to the drain hole 125a. The aforesaid water tub 125 is made from a synthetic resin, for example, a composite material comprising polypropylene as a base material and 15 wt % glass fiber. A heat resisting reinforcement is applied to the water tub 125 so that the water tub can be used as a drying chamber.

A rotating tub 129 accommodates laundry and serves both as a washing tub and as a dehydrating tub. The rotating tub 129 is rotatably provided in the water tub 125. The rotating tub 129 is made from a metal or a metal-based material so as to be strong. The rotating tub 129 has an upper opening substantially in the same manner as the water tub 125 and a number of small holes 129a formed in an overall peripheral wall including the bottom, whereupon the rotating tub 129 is formed into a vertically cylindrical shape. An agitator 130 is rotatably mounted on the central bottom of the rotating tub 129. A balance ring 129b is secured to an upper end of the rotating tub 129.

The rotating tub 129 and the agitator 130 are driven by a drive motor 131 mounted on the underside of the water tub 125. In the washing operation, only the agitator 130 is driven via a clutch mechanism (not shown), whereas both agitator 130 and water tub 125 are driven in the dehydrating or drying operation. However, the water tub 125 is controlled so as to be rotated at a lower speed in the drying operation than in the dehydrating operation. The motor 131 comprises a brushless motor of the outer rotor type as in the first or second embodiment.

A warm air circulating passage 132 supplies warm air into the water tub 125 and is formed so as to extend from the lower end to the upper end of the water tub 125 at an inner corner of the body 121 and at one side of the water tub 125. The warm air circulating passage 132 has a lower end communicating through a duct 133a with the drain hole 125a formed in a lower portion of the water tub 125. The warm air circulating passage 132 has an upper end which is open so as to face the top opening of the water tub 125. A dehumidifying unit 134 is formed between the ducts 133a and 133b.

A warm air generator comprises a blower 135 and a drying heater 136 both provided downstream from the dehumidifying unit 134. The warm air circulating passage 132 is formed by the duct 133, the dehumidifying unit 134, the warm air generator and a part of the water tub 125.

A heat exchanger 137 constituting the dehumidifying unit 134 is formed into the shape of a tube having bellows. The heat exchanger 137 is connected to the ducts 133a and 133b. A cooling fan 138 supplies outside air as cooling air to the peripheral side of the heat exchanger 137. A short cylindrical duct 139 surrounds an upper portion of the heat exchanger 137 so as to form an air passage guiding the cooling air downward.

Outside air introduced by the cooling fan 138 is guided as cooling air along the duct 139, so that the cooling air flows downward along the outer face of the heat exchanger 137. Air (discharged warm air) flowing upward along the interior of the heat exchanger 137 as shown by arrow in FIG. 17 is cooled such that condensed water content drops, whereby air is dehumidified. The above-described mechanism constitutes an air-cooled dehumidifier 140.

Part of cooled air flowing through the duct 139 flows downward along the outer circumferential wall of the water tub 125, thereby cooling the lower half of the water tub 125. As a result, heat exchange occurs between the discharged warm air and the cooled air, whereupon dehumidification is enhanced by the cooling and condensation of the water content.

Water supply means for pouring the cooling water is provided in the upper interior of the heat exchanger 137. The water supply means comprises a water-supply switching valve 141 connected to a water supply source such as water supply system, water passages 142 and 143 at least bifurcated from the switching valve 141. The water passage 142 communicates with the upper interior of the heat exchanger 137, and a small amount of cooling water is caused to flow along the water passage 142. The water passage 143 faces the interior of the water tub 125, and a large amount of water is supplied along the water passage 143. Accordingly, a small amount of cooling water is supplied from the water passage 142 into the heat exchanger 137. The water is brought into contact with air flowing upward in the heat exchanger 137, thereby cooling the air. As a result, the water content contained in the air is condensed such that the air is dehumidified.

Thus, the water supply means for supplying cooling water is provided in the heat exchanger 137, whereby a water-cooled dehumidifier 144 is constituted. The dehumidifying unit 134 thus have air-cooled and water-cooled dehumidifying means. Particularly, since the heat exchanger 137 in the embodiment is formed into the shape of bellows, a heat-exchange area is increased such that efficient heat exchange can be carried out. An agitating rib 145 protrudes from the lower interior of the heat exchanger 137. Air flowing through the heat exchanger 137 is uniformly brought into contact with the cooling water by the agitating rib 145. Further, since the cooling water is dispersed by the agitating rib 145, the contact between water and air can be rendered further desirable.

Dry air dehumidified by the dehumidifying unit 134 is efficiently changed into warm air by the blower 135 and heater 136 provided downstream for producing warm air. The warm air is supplied through the duct 133b into the water tub 125.

The dehumidifying unit 134 and the warm air circulating passage 132 are fixed to the elastically supported water tub 125 side although detailed mounting structure is eliminated. Further, the cooling fan 138 introducing outside air is also elastically supported at the position where the fan faces the exterior of the body 121. Further, the electrical arrangement of the washer-drier is basically the same as that in the second embodiment.

Figure 18:
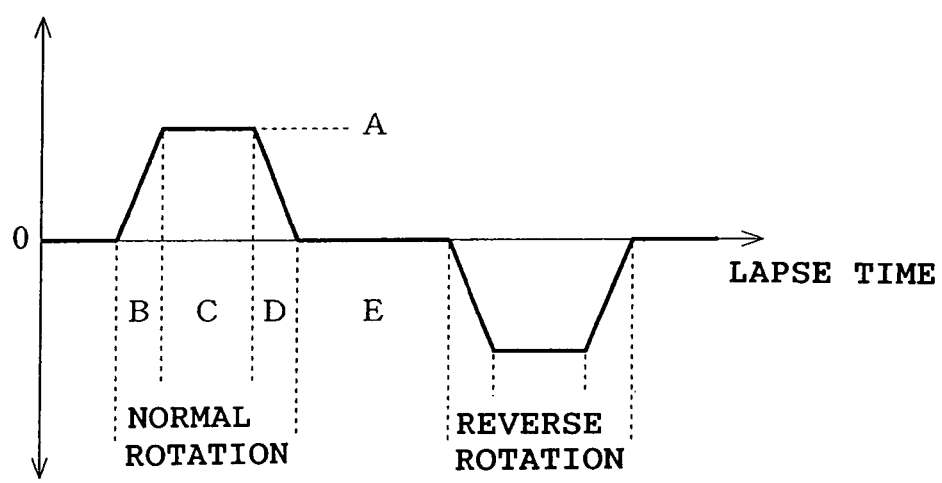
FIG. 18 is a view similar to FIG. 14.

FIGS. 18 to 20B show rotational speed control patterns for the motor 131 in the wash or rinse, dehydration and drying. In the wash or rinse as shown in FIG. 18, the rotational speed is increased from 0 rpm to 150 rpm in 0.3 sec. and maintained at 150 rpm for 0.5 sec. The rotational speed is then decreased from 150 rpm to 0 rpm in 0.5 sec. Subsequently, the direction of rotation is reversed after a stop period of 0.7 sec. This pattern is repeated. In this case, too, the vector control is carried out by the q-axis current command value $Iq_{ref}$ regarding the output torque of the motor 76 in the same manner as in the first embodiment. Regarding the rotational speed, the PI control is carried out, and the full field control is executed with the d-axis current command and value $Id_{ref}$ being set at 0.

In the dehydration as shown in FIG. 19, the rotational speed is increased from 0 rpm to 900 rpm in 3 min. and maintained at 900 rpm for 7 min. The rotational speed is then decreased from 900 rpm to 0 rpm in 1 min. In this case, too, control is executed in accordance with the flowchart of FIG. 4 in the same manner as in the first embodiment. When the duty of the PWM signal exceeds 90% (rotational speed of 400 rpm), the control manner is switched from the vector control to the voltage/phase control, and the field weakening control is executed.

In the drying as shown in FIGS. 20A and 20B, the rotational speed is increased to 50 rpm and maintained at 50 rpm. Subsequently, the rotational speed is decreased from 50 rpm to 0 rpm. It takes 10 minute to increase and decrease the rotational speed in the above-described manner. The direction of rotation is reversed after a one-minute stop period (see FIG. 20A). Further, the agitator 130 is driven alternately in the normal and reverse directions at 100 rpm (see FIG. 20B). This pattern is repeated. In this case, torque is controlled by the vector control and the rotational speed is controlled by the PI control in the same manner as in the washing or rinsing operation. The full field control is carried out.

Namely, although concrete numeric values in these operations differ from those in the second embodiment because of the mechanical differences, the third embodiment is substantially the same as the second embodiment in the basic operation.

According to the third embodiment, the same effect can be achieved from the third embodiment as from the first or second embodiment even when the invention is applied to the washer-drier of the vertical axis type.

The present invention should not be limited by the embodiments described above with reference to the drawings. The following modification and expansion are possible.

The rotational speeds and current values are examples and these values may suitably be changed according to design. Further, the control mode is changed from the vector control to the voltage/phase control in the high speed area of the dehydrating operation. However, the timing for the change should not be limited to duty 90% of the PWM signal. A most suitable criterion may be set according to the design.

INDUSTRIAL APPLICABILITY

As described above, the inverter device of the present invention, when applied to a washer or washer-drier, reduces electrical power consumption and accordingly improve the motor efficiency.

The invention claimed is:

1. An inverter for a washer comprising:
a control unit configured to control a brushless DC motor that supplies a rotational driving force for performance of washing, rinsing and dehydrating operations with respect to a full automatic washer in which steps of wash, rinse and dehydration are consecutively carried out, wherein the control unit controls the brushless DC motor so that the brushless DC motor is operated with a full field in the washing and rinsing operations and a low-speed rotation region of the dehydrating operation and so that the brushless DC motor is operated with a weak field in a high speed rotation region of the dehydrating operation, and wherein the control unit controls an output torque of the brushless DC motor in a vector control based on a current command generated according to a speed command when the full field operation is carried out and the control unit controls the brushless DC motor in a voltage/phase control based on a voltage command and a phase command both generated according to the speed command when the field weakening operation is carried out.

2. An inverter for a washer-drier comprising:

a control unit configured to control a brushless DC motor that supplies a rotational driving force for performance of washing, rinsing, dehydrating and drying operations with respect to a full automatic washer-drier in which steps of wash, rinse, dehydration and drying are consecutively carried out, wherein the control unit controls the brushless DC motor so that the brushless DC motor is operated with a full field in the washing and rinsing operations and a low-speed rotation region of the dehydrating operation and so that the brushless DC motor is operated with a weak field in a high speed rotation region of the dehydrating operation, and wherein the control unit controls an output torque of the brushless DC motor in a vector control based on a current command generated according to a speed command when the full field operation is carried out and the control unit controls the brushless DC motor in a voltage/phase control based on a voltage command and a phase command both generated according to the speed command when the field weakening operation is carried out.

* * * * *